(12) United States Patent
Nakajima et al.

(10) Patent No.: US 11,648,711 B2
(45) Date of Patent: May 16, 2023

(54) MULTILAYER CORE MOLDING METHOD

(71) Applicant: BRIDGESTONE SPORTS CO., LTD., Tokyo (JP)

(72) Inventors: Kazunori Nakajima, Chichibu (JP); Satoru Judai, Chichibu (JP)

(73) Assignee: BRIDGESTONE SPORTS CO., LTD., Tokyo (JP)

( * ) Notice: Subject to any disclaimer, the term of this patent is extended or adjusted under 35 U.S.C. 154(b) by 309 days.

(21) Appl. No.: 17/089,722

(22) Filed: Nov. 5, 2020

(65) Prior Publication Data

US 2021/0170644 A1 Jun. 10, 2021

(30) Foreign Application Priority Data

Dec. 5, 2019 (JP) .............................. JP2019-220554

(51) Int. Cl.
*B29C 43/20* (2006.01)
*B29C 43/52* (2006.01)
*B29C 71/02* (2006.01)
*B29L 31/54* (2006.01)
*B29K 21/00* (2006.01)

(52) U.S. Cl.
CPC ............ *B29C 43/203* (2013.01); *B29C 43/52* (2013.01); *B29C 71/02* (2013.01); *B29K 2021/00* (2013.01); *B29L 2031/546* (2013.01)

(58) Field of Classification Search
None
See application file for complete search history.

(56) References Cited

U.S. PATENT DOCUMENTS

| 6,436,327 B1 | 8/2002 | Cloutier et al. | |
| 2002/0066976 A1* | 6/2002 | Cloutier | B29C 31/08 264/250 |
| 2016/0059447 A1* | 3/2016 | Kennedy, III | B29C 43/146 156/196 |

\* cited by examiner

*Primary Examiner* — Robert J Grun
(74) *Attorney, Agent, or Firm* — Kenja IP Law PC

(57) ABSTRACT

A multilayer core molding method for molding a multilayer core of a golf ball includes an upstream process; and a downstream process, wherein the intermediate molded body includes: an inner core; and an unvulcanized or semi-vulcanized first outer core material, and the downstream process molding apparatus includes: a first downstream process mold including a substantially hemispherical first downstream process mold cavity surface; a second downstream process mold including a substantially hemispherical second downstream process mold cavity surface; and an intermediate plate including a substantially hemispherical intermediate plate cavity surface, and a substantially hemispherical intermediate plate projecting surface, and wherein the downstream process includes: a second outer core arrangement step; an intermediate molded body arrangement; and a preparatory molding step.

12 Claims, 15 Drawing Sheets

FIG. 3
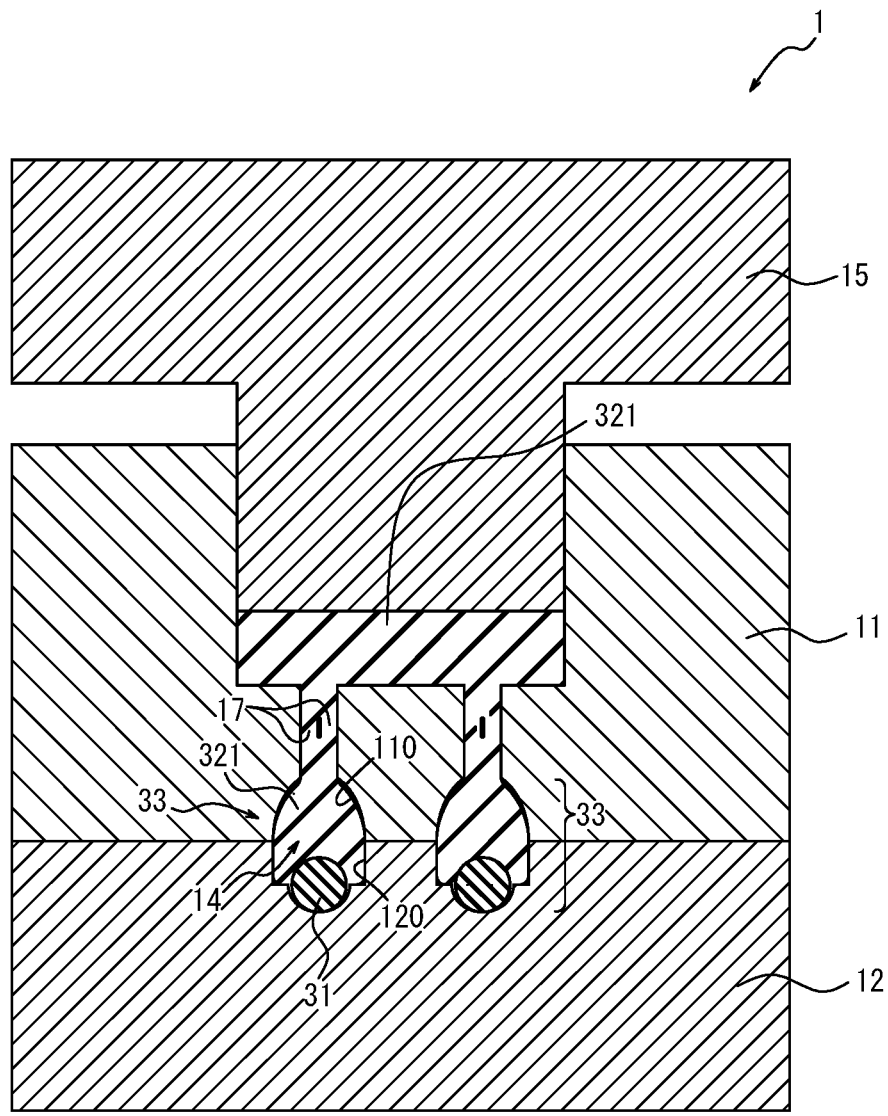
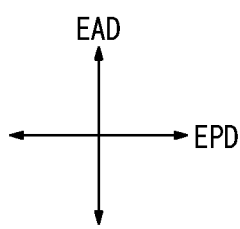

FIG. 4
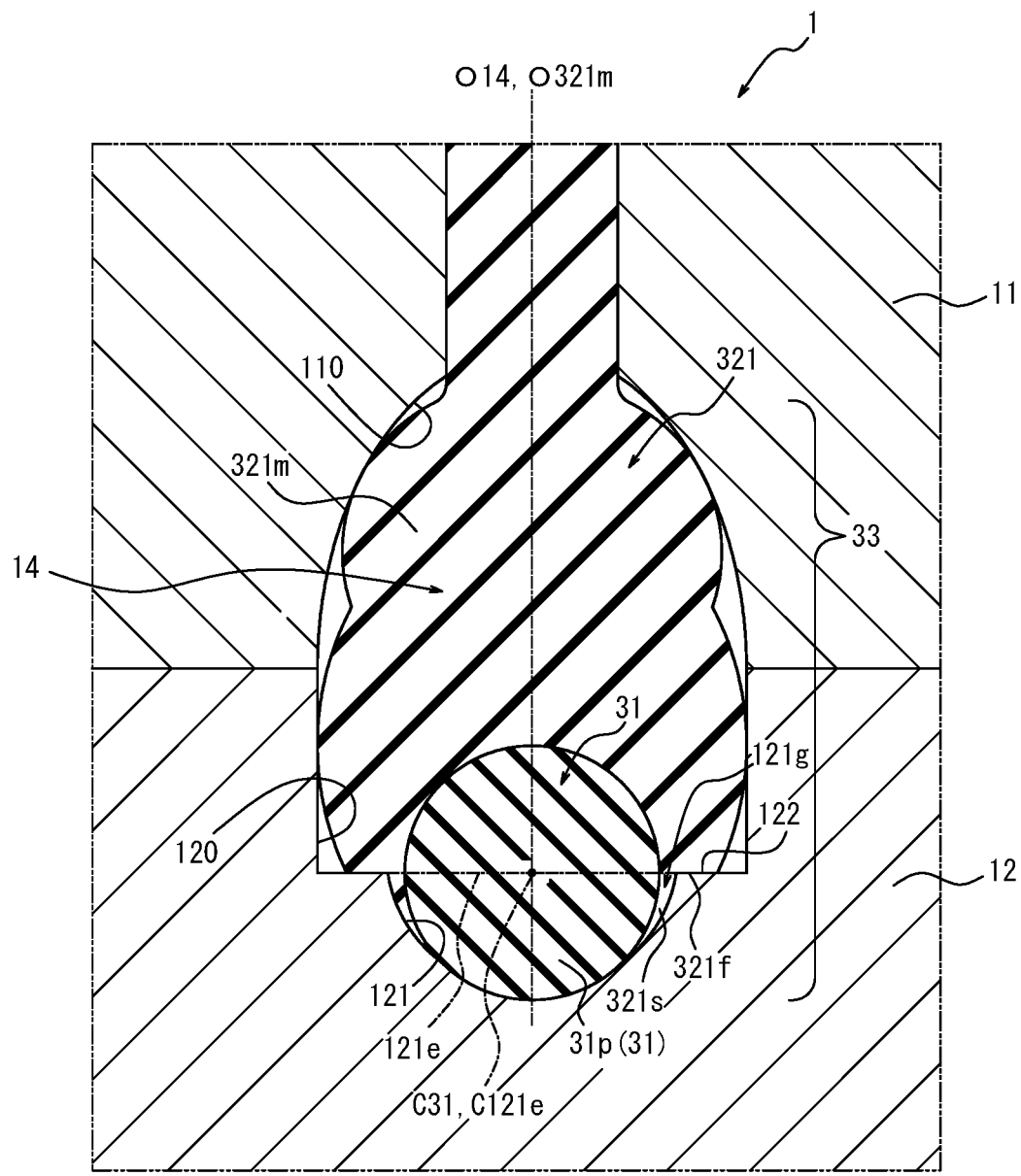
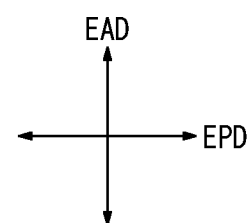

FIG. 8
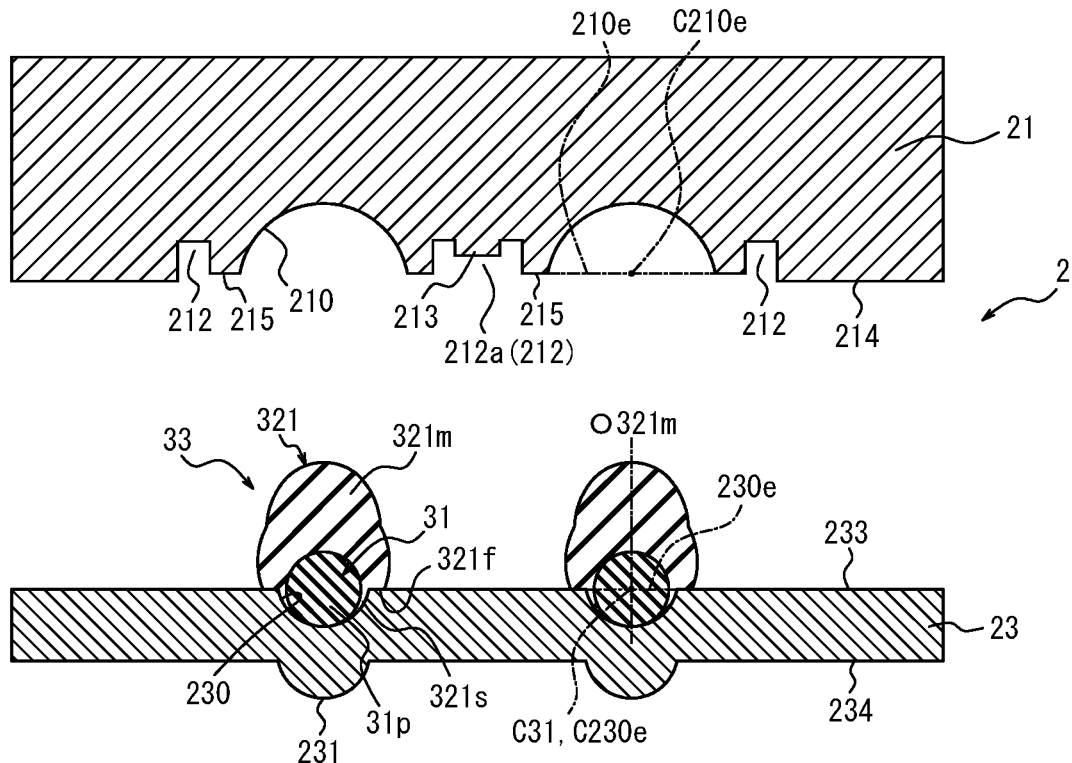
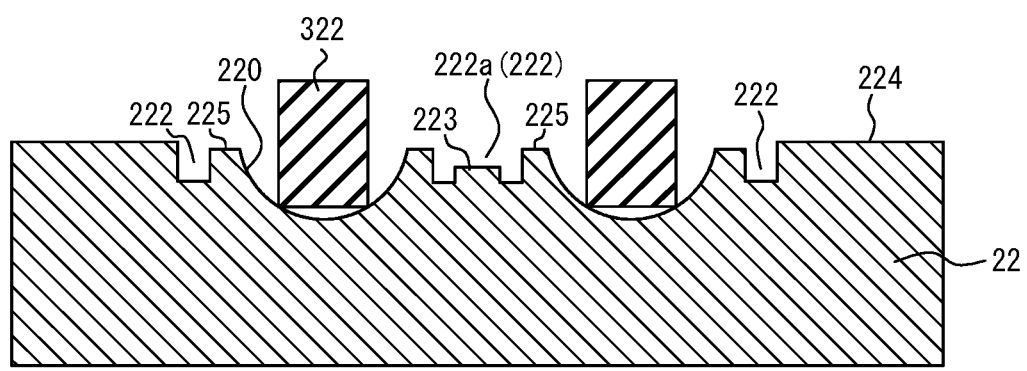
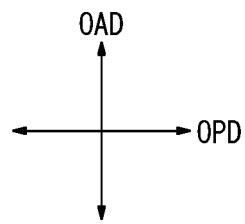

FIG. 10
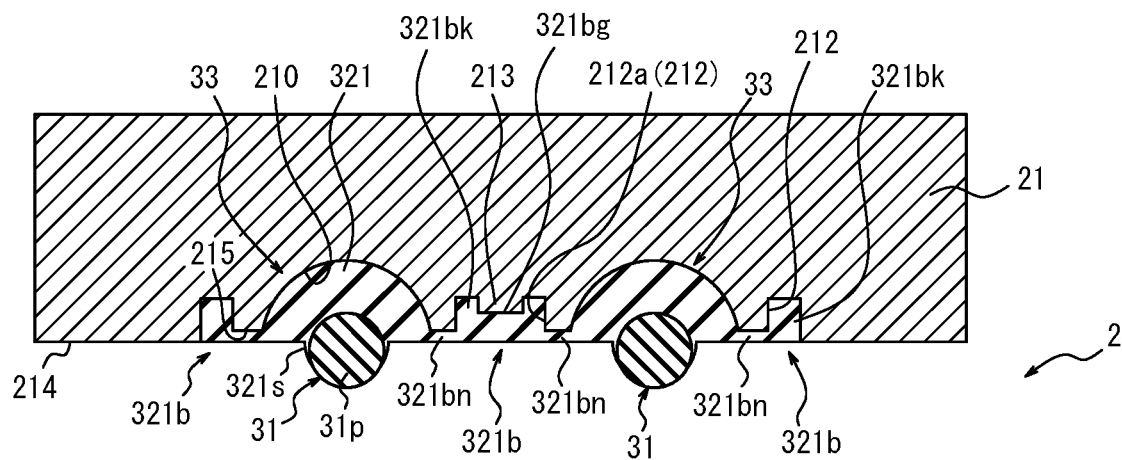
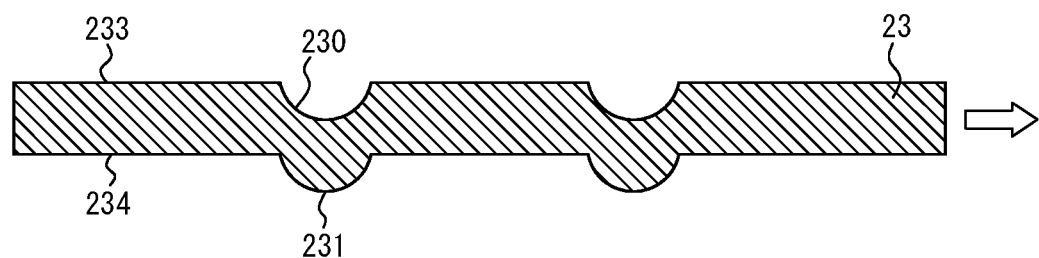
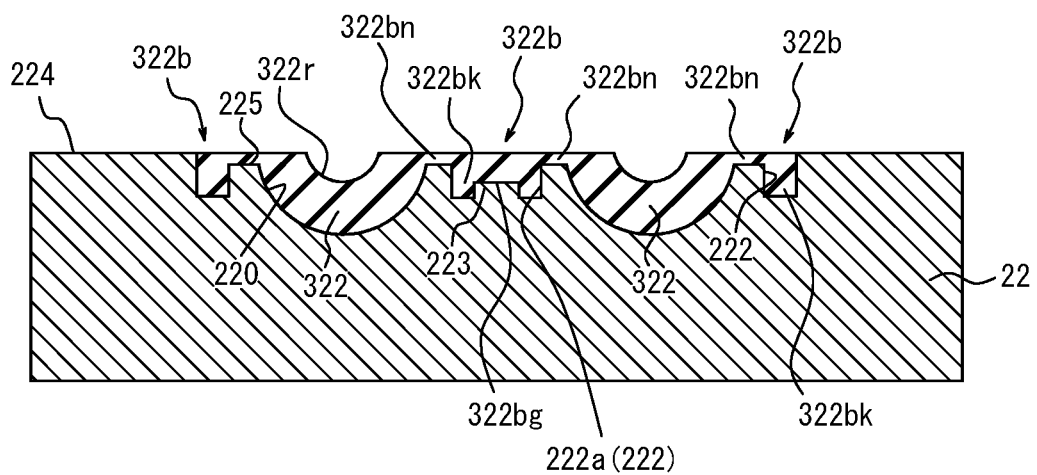

MULTILAYER CORE MOLDING METHOD

TECHNICAL FIELD

The present disclosure relates to a multilayer core molding method.

This application is based on and claims priority to Japanese patent application No. 2019-220554, filed on Dec. 5, 2019, the entire content of which is incorporated herein by reference.

BACKGROUND

Known methods for molding multilayer cores of golf balls include techniques to arrange, on spherical inner cores, outer core materials, which are discrete from the inner cores and molded to have recesses for receiving the inner cores, and subsequently close molds to thereby compression-mold the outer core materials around the inner cores in accordance with substantially hemispherical cavity surfaces designed to mold outer cores (e.g., Patent Literature 1, which is hereinafter referred to as PTL1).

CITATION LIST

Patent Literature

PTL 1: U.S. Pat. No. 6,436,327 B1

SUMMARY

The aforementioned existing technique, however, may cause eccentricity in the inner cores.

It would be helpful to provide a multilayer core molding method capable of preventing the eccentricity in the inner cores.

A multilayer core molding method for molding a multilayer core of a golf ball according to an embodiment of the present disclosure includes:

an upstream process of obtaining an intermediate molded body; and a downstream process of performing molding using a downstream process molding apparatus, wherein the intermediate molded body includes:

an inner core; and an unvulcanized or semi-vulcanized first outer core material that covers only part of a surface of the inner core and is integrated with the inner core, and the downstream process molding apparatus includes:

a first downstream process mold including a substantially hemispherical first downstream process mold cavity surface;

a second downstream process mold including a substantially hemispherical second downstream process mold cavity surface; and an intermediate plate including a substantially hemispherical intermediate plate cavity surface configured to be arranged facing the first downstream process mold cavity surface, and a substantially hemispherical intermediate plate projecting surface configured to be arranged facing the second downstream process mold cavity surface, and wherein the downstream process includes:

a second outer core arrangement step of arranging a second outer core material on the second downstream process mold cavity surface or the intermediate plate projecting surface;

an intermediate molded body arrangement step of arranging the intermediate molded body on the intermediate plate cavity surface or the first downstream process mold cavity surface; and a preparatory molding step, performed after the second outer core arrangement step and the intermediate molded body arrangement step, of compression-molding the second outer core material and the intermediate molded body, in a state in which the first downstream process mold, the second downstream process mold, and the intermediate plate are closed against each other.

In the multilayer core molding method according a preferred embodiment, the downstream process further includes:

an intermediate plate removal step, performed after the preparatory molding step, of removing the intermediate plate; and a raw core forming step, performed after the intermediate plate removal step, of assembling the second outer core material to the intermediate molded body to form a raw multilayer core.

In the multilayer core molding method according to another preferred embodiment, in the intermediate plate removal step, while the intermediate plate is removed, the second outer core material is held on the second downstream process mold cavity surface, and the intermediate molded body is held on the first downstream process mold cavity surface, and in the raw core forming step, the first downstream process mold and the second downstream process mold are closed against each other to assemble the second outer core material to the intermediate molded body.

In the multilayer core molding method according to still another preferred embodiment, in the preparatory molding step, part of the first outer core material of the intermediate molded body sticks out from between the first downstream process mold cavity surface and the intermediate plate cavity surface to form a first flash, and part of the second outer core material sticks out from between the intermediate plate projecting surface and the second downstream process mold cavity surface to form a second flash.

In the multilayer core molding method according to still another preferred embodiment, in the preparatory molding step, a temperature $T1$ of the first downstream process mold, a temperature $T2$ of the second downstream process mold, and a temperature $T3$ of the intermediate plate satisfy the relation $T1 \geq T2 \geq T3$.

In the multilayer core molding method according to still another preferred embodiment, in the preparatory molding step, a temperature $T1$ of the first downstream process mold, a temperature $T2$ of the second downstream process mold, and a temperature $T3$ of the intermediate plate satisfy the relation $T1=T2>T3$.

In the multilayer core molding method according to still another preferred embodiment, in the preparatory molding step, a temperature $T1$ of the first downstream process mold satisfies $80°\,C. < T1 < 170°\,C.$ In the multilayer core molding method according to still another preferred embodiment, in the preparatory molding step, a temperature $T1$ of the first downstream process mold, a temperature $T2$ of the second downstream process mold, and a temperature $T3$ of the intermediate plate satisfy the relation $T1>T2>T3$.

In the multilayer core molding method according to still another preferred embodiment, the downstream process further includes a vulcanization step, performed after the raw core forming step, of vulcanizing the raw multilayer core in a state in which the first downstream process mold and the second downstream process mold are closed against each other.

In the multilayer core molding method according to still another preferred embodiment, a temperature T1' of the first downstream process mold and a temperature T2' of the second downstream process mold in the vulcanization step are respectively equal to a temperature T1 of the first downstream process mold and a temperature T2 of the second downstream process mold in the preparatory molding step.

In the multilayer core molding method according to still another preferred embodiment, a time period t of the compression molding in the preparatory molding step is shorter than a time period t' of the vulcanization in the vulcanization step.

The present disclosure provides a multilayer core molding method that prevents the eccentricity in the inner cores.

BRIEF DESCRIPTION OF THE DRAWINGS

In the accompanying drawings:

FIG. 3 illustrates a covering step in the upstream process of the multilayer core molding method according to the first embodiment of the present disclosure;

FIG. 4 is a partially enlarged view of FIG. 3;

FIG. 8 illustrates an intermediate molded body arrangement step in the downstream process of the multilayer core molding method according to the first embodiment of the present disclosure;

FIG. 10 illustrates an intermediate plate removal step in the downstream process of the multilayer core molding method according to the first embodiment of the present disclosure;

DETAILED DESCRIPTION

Figure 1:
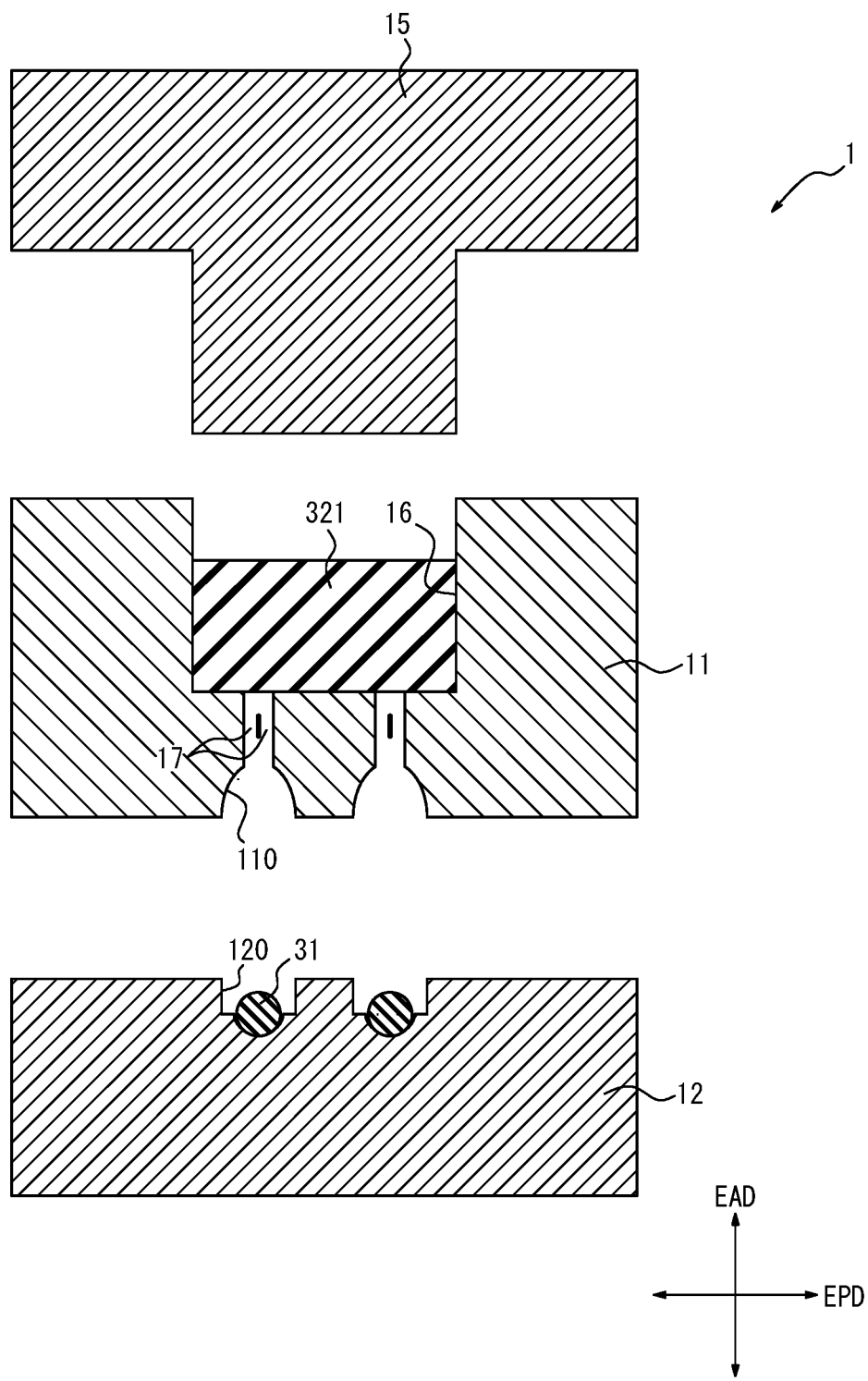
FIG. 1 illustrates an inner core arrangement step in an upstream process of a multilayer core molding method according to a first embodiment of the present disclosure.

Hereinafter, embodiments of a multilayer core molding method according to the present disclosure will be described by illustration with reference to the drawings.

The same components in the figures are denoted by the same reference numerals.

With reference to FIGS. 1 to 14, a description is given of the multilayer core molding method according to a first embodiment of the present disclosure.

Figure 14:
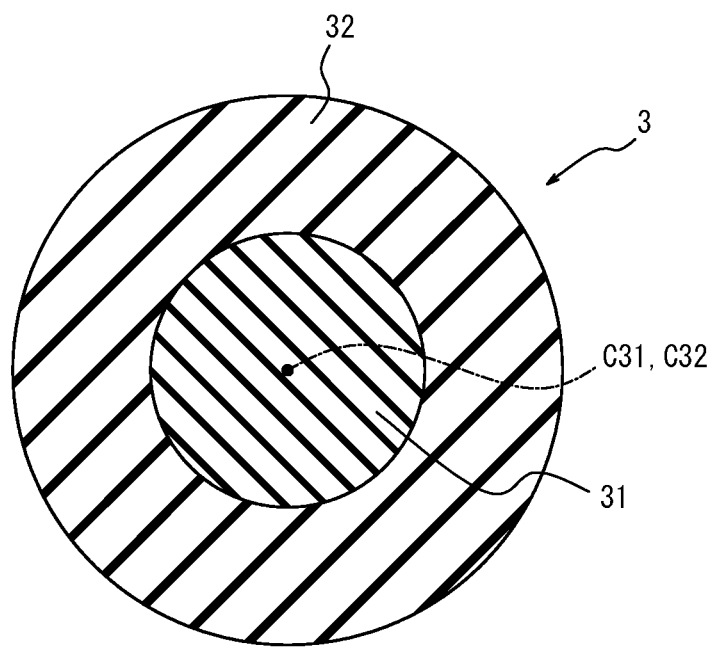
FIG. 14 is a sectional view of one of the multilayer cores of FIG. 12.

The multilayer core molding method of the present embodiment is used, for example, to mold a multilayer core 3 of a golf ball as illustrated in FIG. 14. The multilayer core 3 is configured to constitute part of the golf ball. The multilayer core 3 illustrated in FIG. 14 includes a spherical inner core 31 and an outer core 32, which is arranged adjacent to the inner core 31 on an outer side in a circumferential direction of the inner core 31.

Although the multilayer core 3 in the example of FIG. 14 is configured as a dual-layer core consisting of two layers, namely, the inner core 31 and the outer core 32, the multilayer core 3 molded by the multilayer core molding method of the present embodiment may be configured as a multilayer core consisting of three or more layers. For example, the inner core 31 may consist of a plurality of core layers. Further, the multilayer core 3 may include additional one or more core layers on the outer side in the circumferential direction of the outer core 32.

The inner core 31 and the outer core 32 are each formed of rubber. For example, butadiene rubber is preferably used as rubber that forms the inner core 31 and the outer core 32. Preferably, rubber that forms the inner core 31 and rubber that forms the outer core 32 have compositions different from each other. Preferably, rubber that forms the inner core 31 and rubber that forms the outer core 32 have hardnesses different from each other.

Additionally, the golf ball (which is not illustrated) having the multilayer core 3 may have any configuration, and examples of configurations include one or more intermediate layers arranged on the outer side in the circumferential direction of the multilayer core 3, and a cover arranged on the outer side in the circumferential direction of the one or more intermediate layers. The intermediate layers are formed of, for example, resin. The cover is formed of, for example, urethane or ionomer.

To start with, steps included in the multilayer core molding method according to the first embodiment of the present disclosure will be schematically described.

The multilayer core molding method according to the first embodiment of the present disclosure includes an upstream process (FIGS. 1 to 6) and a downstream process (FIGS. 7 to 13).

[Upstream Process]

Firstly, the upstream process (FIGS. 1 to 6) will be schematically described. In the upstream process, molding is performed using an upstream process molding apparatus 1. In the upstream process, intermediate molded bodies 33, which will be described later, are obtained. The upstream process includes an inner core arrangement step, a covering step, and an intermediate molded body removal step.

As illustrated in FIG. 1, the upstream process molding apparatus 1 includes a first upstream process mold 11 and a second upstream process mold 12.

The first upstream process mold 11 and the second upstream process mold 12 are configured to be arranged facing each other. In the example of FIG. 1, the first upstream process mold 11 and the second upstream process mold 12 are configured to be arranged facing each other in a vertical direction, and the first upstream process mold 11 is configured to be positioned on an upper side in the vertical direction with respect to the second upstream process mold 12. However, the first upstream process mold 11 and the second upstream process mold 12 may be configured to be arranged facing each other in any direction other than the vertical direction, and the first upstream process mold 11 may be configured to be positioned on any side other than the upper side in the vertical direction with respect to the second upstream process mold 12.

Herein, a direction (e.g., the vertical direction in the example of the figure) in the upstream process molding apparatus 1 in which the first upstream process mold 11 and the second upstream process mold 12 are arranged facing each other is referred to as an "upstream process mold axial direction (EAD)." On the other hand, a direction (e.g., a horizontal direction in the example of the figure) perpendicular to the upstream process mold axial direction (EAD) is referred to as an "upstream process mold perpendicular-to-axis direction (EPD)."

The first upstream process mold 11 has one or more (e.g., in the example of the figure, a plurality of) first upstream process mold cavity surfaces 110. The first upstream process mold cavity surfaces 110 are configured to be arranged facing second upstream process mold cavity surfaces 120 of the second upstream process mold 12. The first upstream process mold cavity surfaces 110 are each configured in a hollow shape which is open on a side thereof closer to the corresponding second upstream process mold cavity surface 120 (e.g., on the lower side in the vertical direction in the example of FIG. 1).

The second upstream process mold 12 has one or more (e.g., in the example of the figure, a plurality of) second upstream process mold cavity surfaces 120. The second upstream process mold cavity surfaces 120 are configured to be arranged facing the first upstream process mold cavity surfaces 110 of the first upstream process mold 11. The second upstream process mold cavity surfaces 120 are each configured in a hollow shape which is open on a side thereof closer to the corresponding first upstream process mold cavity surface 110 (e.g., on the upper side in the vertical direction in the example of FIG. 1).

As illustrated in FIG. 3, the upstream process molding apparatus 1 is configured, in a state in which the first upstream process mold 11 and the second upstream process mold 12 are closed against each other, to define upstream process mold cavities 14 between the first upstream process mold cavity surfaces 110 and the second upstream process mold cavity surfaces 120.

—Inner Core Arrangement Step—

Figure 2:
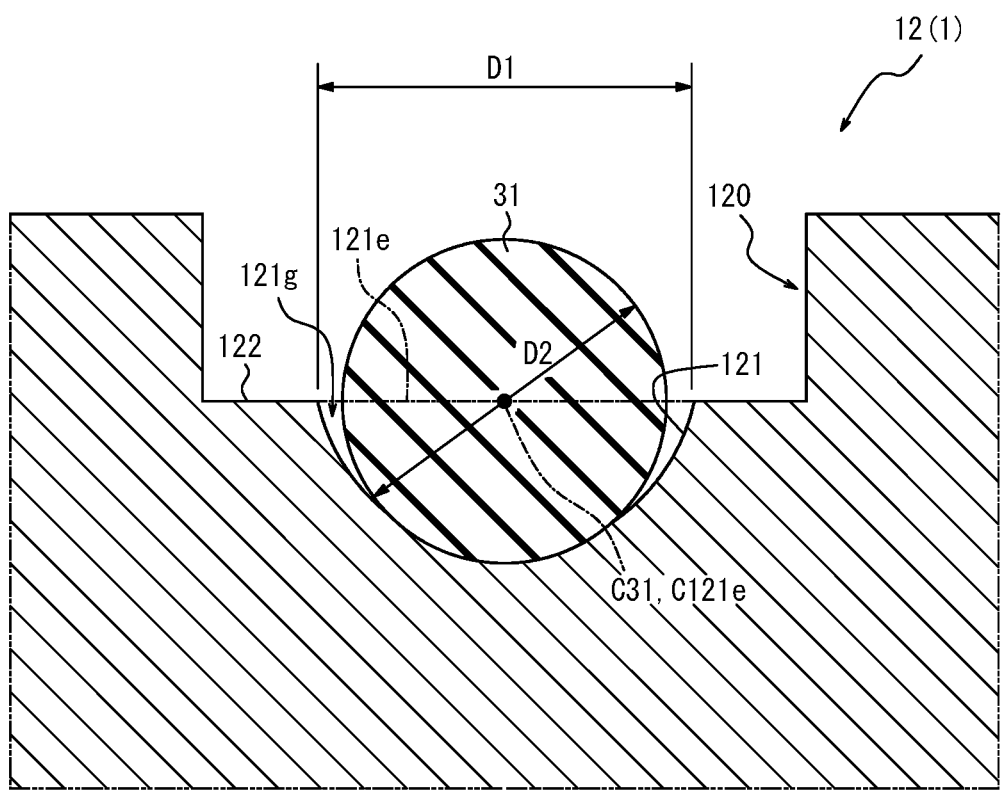
FIG. 2 is a partially enlarged view of FIG. 1.

In the inner core arrangement step, the inner cores 31 that have been vulcanized are arranged on the second upstream process mold cavity surfaces 120 of the second upstream process mold 12 (FIGS. 1 and 2).

Herein, the term "on" in " . . . arranged on the second upstream process mold cavity surfaces 120" refers to arrangement that causes contact with the second upstream process mold cavity surfaces 120.

The inner cores 31 are formed of rubber, as described above. The inner cores 31 are vulcanized in advance before the inner core arrangement step, and the entire inner cores 31 have been vulcanized. The inner cores 31 are each configured in a spherical shape. Preferably, each inner core 31, after being vulcanized and before subjected to the inner core arrangement step, is polished into the spherical shape.

Note that the term "vulcanized" herein refers to a state in which vulcanization is completely completed. One method of determining, for a certain member (e.g., one of the inner cores 31), the "state in which vulcanization is completely completed" is, for example, to subject a sample piece cut out from the member to differential scanning calorimetry (DSC) measurement. When substantially no exothermic reaction is observed before and after the temperature at which organic peroxide added is to be decomposed, the member may be determined to be in a state in which the organic peroxide is not left, that is, the "state in which vulcanization is completely completed."

On the other hand, the term "unvulcanized" refers to a state in which no vulcanization has occurred at all. The term "semi-vulcanized" refers to a state between "vulcanized" and "unvulcanized", that is, a state in which vulcanization has progressed halfway.

—Covering Step—

In the covering step, which is performed after the inner core arrangement step, the inner cores 31 are covered with first outer core materials 321 to obtain the intermediate molded bodies 33 (FIGS. 3 and 4).

The intermediate molded bodies 33 obtained in the covering step each include the inner core 31, and the first outer core material 321, which covers only part of a surface of the inner core 31 and is integrated with the inner core 31. In the example of the figure, each intermediate molded body 33 obtained in the covering step is composed of the inner core 31 and the first outer core material 321, which covers only part of the surface of the inner core 31 and is integrated with the inner core 31. The inner core 31 and the first outer core material 321 are closely contacted (adhered) to each other and accordingly, prevented from being detached from each other or hardly detached from each other.

The first outer core material 321 included in each intermediate molded body 33 has a body portion 321m, which covers the inner core 31. The inner core 31 includes a protruding portion 31p (FIG. 4), which is not covered by the body portion 321m of the first outer core material 321 and protrudes to the outside of the body portion 321m. The protruding portion 31p is substantially hemispherical.

The first outer core materials 321 constitute part of the outer cores 32 included in the multilayer cores 3 (FIG. 14), which are final products obtained through vulcanization in a later-described vulcanization step in the downstream process. The first outer core materials 321 are rubber, as described above with respect to the outer cores 32.

The entire first outer core materials 321, immediately before and while covering the inner cores 31, are preferably in an unvulcanized state. In this case, in the covering step, the first outer core materials 321, after covering the inner cores 31, are preferably maintained in the unvulcanized state even when heated for a predetermined time period or when not heated. That is, the entire first outer core materials 321 of the intermediate molded bodies 33 obtained in the covering step are preferably in the unvulcanized state. In the covering step, however, the first outer core materials 321, after covering the inner cores 31, may be at least partially brought into a semi-vulcanized state (in the case of the partially semi-vulcanized state, a remaining part of the first core materials 321 are preferably in an unvulcanized state). In this case, the first outer core materials 321 of the intermediate molded bodies 33 obtained in the covering step are at least partially in the semi-vulcanized state (in the case of the partially semi-vulcanized state, the remaining part of the first core materials 321 are preferably in the unvulcanized state).

Additionally, the first outer core materials 321, immediately before and while covering the inner cores 31, may be at least partially in the semi-vulcanized state (in the case of the partially semi-vulcanized state, the remaining part of the first core materials 321 may be in the unvulcanized state). In this case, the first outer core materials 321 of the intermediate molded bodies 33 obtained in the covering step are preferably at least partially in the semi-vulcanized state (in the case of the partially semi-vulcanized state, the remaining part of the first outer core materials 321 are preferably in the unvulcanized state)

An outer surface of the first outer core material 321 of each intermediate molded body 33 obtained in the covering step may be configured in any shape. In the example of the figure, the outer surface of the first outer core material 321 of the intermediate molded body 33 is configured in a substantially truncated cone shape.

—Intermediate Molded Body Removal Step—

Figure 5:
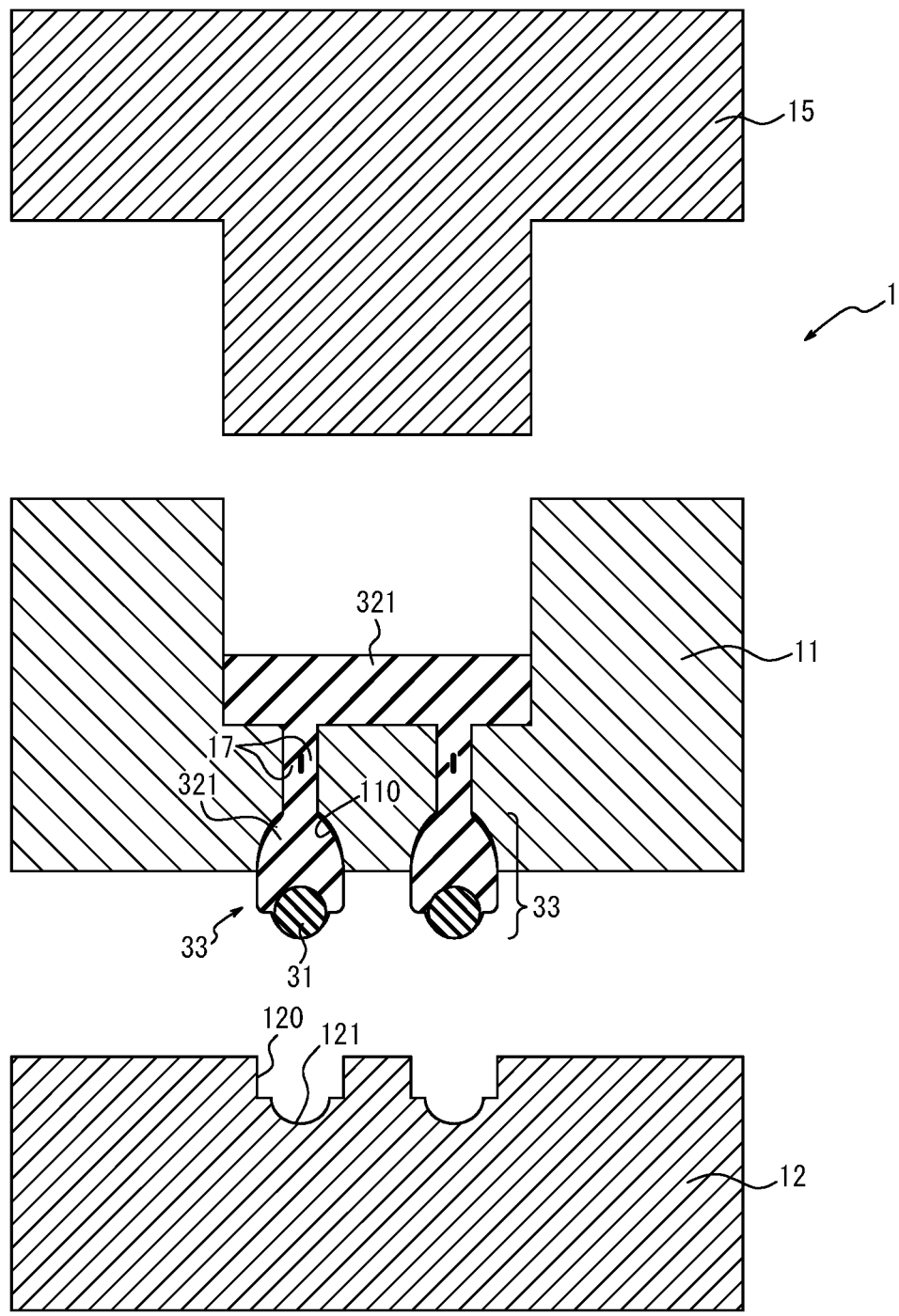
FIG. 5 illustrates an intermediate molded body removal step in the upstream process of the multilayer core molding method according to the first embodiment of the present disclosure.
Figure 6:
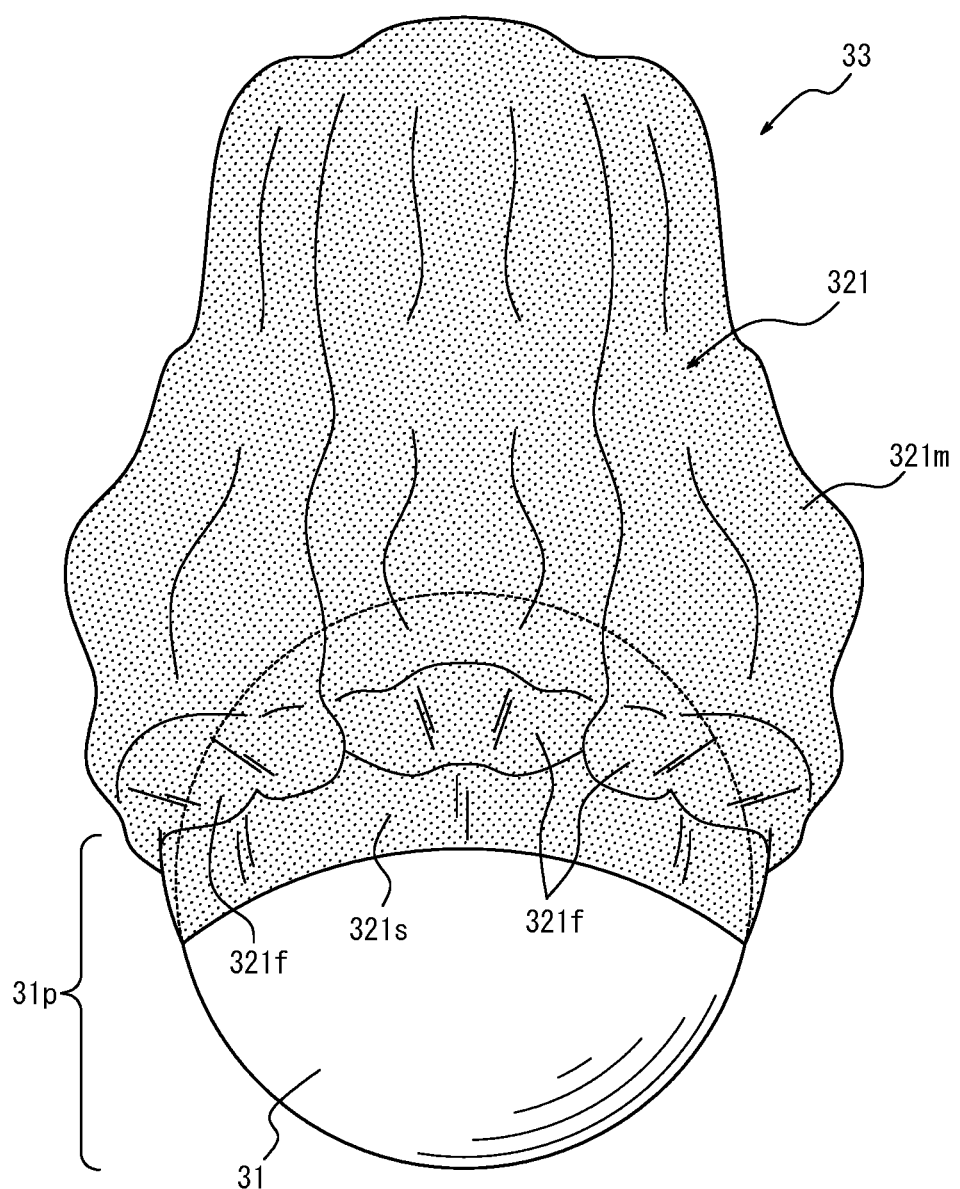
FIG. 6 is a perspective view of the intermediate molded body of FIG. 5.

In the intermediate molded body removal step, which is performed after the covering step, the intermediate molded bodies 33 are removed from the upstream process molding apparatus 1 (FIGS. 5 and 6). FIG. 6 illustrates one of the intermediate molded bodies 33 obtained after the intermediate molded body removal step.

[Downstream Process]

Secondly, the downstream process (FIGS. 7 to 13) will be schematically described. In the downstream process, molding is performed using a downstream process molding apparatus 2. In the downstream process, the intermediate molded bodies 33 obtained in the upstream process are used to obtain the multilayer cores 3 (FIG. 14). The downstream process includes a second outer core arrangement step, an intermediate molded body arrangement step, a preparatory molding step, an intermediate plate removal step, a raw core forming step, the vulcanization step, and a multilayer core removal step.

Figure 7:
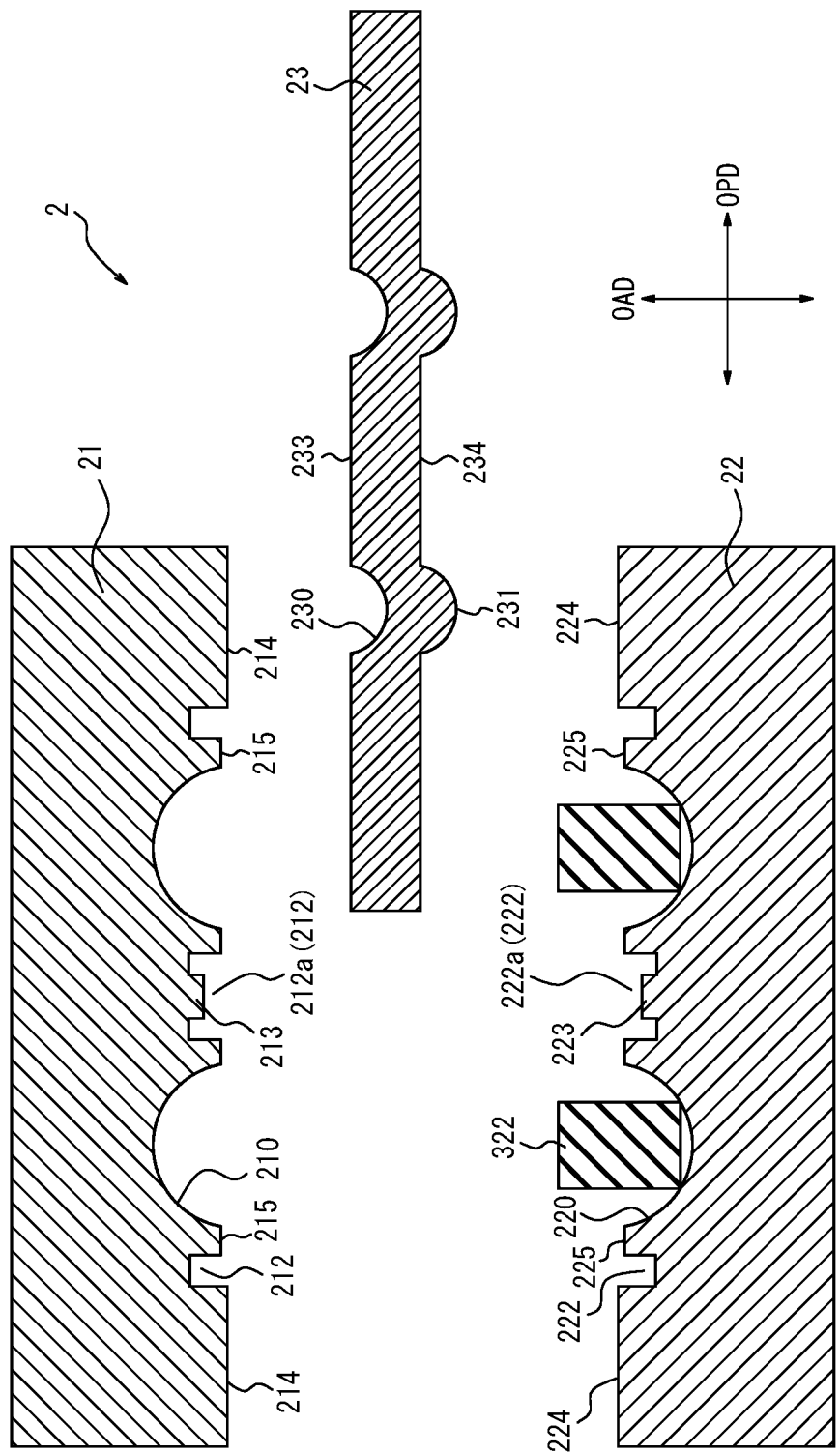
FIG. 7 illustrates a second outer core arrangement step in a downstream process of the multilayer core molding method according to the first embodiment of the present disclosure.

As illustrated in FIGS. 7 and 8, the downstream process molding apparatus 2 includes a first downstream process mold 21, a second downstream process mold 22, and an intermediate plate 23.

The intermediate plate 23 is arranged between the first downstream process mold 21 and the second downstream process mold 22, and is configured to be arranged facing the first downstream process mold 21 and the second downstream process mold 22 (FIG. 8).

In the examples of FIGS. 7 and 8, the first downstream process mold 21, the intermediate plate 23, and the second downstream process mold 22 are configured to be disposed along the vertical direction, and the first downstream process mold 21 is configured to be positioned on the upper side in the vertical direction with respect to the second downstream process mold 22. The first downstream process mold 21, the intermediate plate 23, and the second downstream process mold 22, however, may be configured to be disposed along any direction other than the vertical direction, and the first downstream process mold 21 may be configured to be positioned on any side other than the upper side in the vertical direction with respect to the second downstream process mold 22.

Herein, a direction (e.g., the vertical direction in the examples of the figures) in the downstream process molding apparatus 2 in which the first downstream process mold 21, the intermediate plate 23, and the second downstream process mold 22 are arranged facing each other is referred to as a "downstream process mold axial direction (OAD)." On the other hand, a direction (e.g., the horizontal direction in the examples of the figures) perpendicular to the downstream process mold axial direction (OAD) is referred to as a "downstream process mold perpendicular-to-axis direction (OPD)."

The first downstream process mold 21 has one or more (e.g., in the examples of the figures, a plurality of) first downstream process mold cavity surfaces 210. The first downstream process mold cavity surfaces 210 are configured to be arranged facing intermediate plate cavity surfaces 230 of the intermediate plate 23 (FIG. 8). The first downstream process mold cavity surfaces 210 are each configured in a hollow shape that is open on a side thereof closer to the corresponding intermediate plate cavity surface 230 (e.g., on the lower side in the vertical direction in the example of FIG. 8). The first downstream process mold cavity surface 210 is configured in a substantially hemispherical shape. The first downstream process mold 21 further includes, on a surface thereof closer to the intermediate plate 23 (e.g., on the lower side in the vertical direction in the example of FIG. 8), flat surfaces 215, which extend parallel to the downstream process mold perpendicular-to-axis direction OPD on the outer side in the circumferential direction of the first downstream process mold cavity surfaces 210. In the examples of the figures, each flat surface 215 continues from the corresponding first downstream process mold cavity surface 210 to the outer side in the circumferential direction of the first downstream process mold cavity surface 210, and extends continuously over the entire circumference around the first downstream process mold cavity surface 210. The first downstream process mold 21 further includes, on the surface thereof closer to the intermediate plate 23 (e.g., on the lower side in the vertical direction in the example of FIG. 8), flat surfaces 214, which are positioned closer to the intermediate plate 23 than the flat surfaces 215 are (e.g., on the lower side in the vertical direction in the example of FIG. 8) and which extend parallel to the downstream process mold perpendicular-to-axis direction OPD on the outer side in the circumferential direction of the first downstream process mold 21.

The second downstream process mold 22 has one or more (in the examples of the figures, a plurality of) second downstream process mold cavity surfaces 220. The second downstream process mold cavity surfaces 220 are configured to be arranged facing intermediate plate projecting surfaces 231 of the intermediate plate 23 (FIG. 8). The second downstream process mold cavity surfaces 220 are each configured in a hollow shape that is open on a side thereof closer to the corresponding intermediate plate projecting surface 231 (e.g., on the upper side in the vertical direction in the example of FIG. 8). The second downstream process mold cavity surface 220 is configured in a substantially hemispherical shape. The second downstream process mold 21 further includes, on a surface thereof closer to the intermediate plate 23 (e.g., on the upper side in the vertical direction in the example of FIG. 8), flat surfaces 225, which extend parallel to the downstream process mold perpendicular-to-axis direction OPD on the outer side in the circumferential direction of the second downstream process mold cavity surfaces 220. In the examples of the figures, each flat surface 225 continues from the corresponding second downstream process mold cavity surface 220 to the outer side in the circumferential direction of the second downstream process mold cavity surface 220, and extends continuously over the entire circumference around the second downstream process mold cavity surface 220. The second downstream process mold 22 further includes, on the surface thereof closer to the intermediate plate 23 (e.g., on the upper side in the vertical direction in the example of FIG. 8), flat surfaces 224, which are positioned closer to the intermediate plate 23 than the flat surfaces 225 are (e.g., on the upper side in the vertical direction in the example of FIG. 8) and which extend parallel to the downstream process mold perpendicular-to-axis direction OPD on the outer side in the circumferential direction of the second downstream process mold 22.

The intermediate plate 23 includes, on a surface thereof closer to the first downstream process mold 21 (e.g., on the upper side in the vertical direction in the example of FIG. 8), the one or more (e.g., in the examples of the figures, the plurality of) intermediate plate cavity surfaces 230. The intermediate plate cavity surfaces 230 are configured to be arranged facing the first downstream process mold cavity surfaces 210 of the first downstream process mold 21 (FIG. 8). The intermediate plate cavity surfaces 230 are each configured in a hollow shape that is open on a side thereof closer to the corresponding first downstream process mold cavity surface 210 (e.g., on the upper side in the vertical direction in the example of FIG. 8). The intermediate plate cavity surface 230 is configured in a substantially hemispherical shape. The intermediate plate cavity surfaces 230 define cavities that are to receive the protruding portions 31p of the inner cores 31 of the intermediate molded bodies 33. The intermediate plate 23 further includes, on the surface thereof closer to the first downstream process mold 21 (e.g., on the upper side in the vertical direction in the example of FIG. 8), first flat surfaces 233, each of which continues from the corresponding intermediate plate cavity surface 230 to the outer side in the circumferential direction of the intermediate plate cavity surface 230 and extends parallel to the downstream process mold perpendicular-to-axis direction OPD. In the examples of the figures, each first flat surface 233 continuously extends over the entire circumference around the corresponding intermediate plate cavity surface 230, and continuously extends between adjacent intermediate plate cavity surfaces 230 so that the plurality of intermediate plate cavity surfaces 230 is coupled.

The intermediate plate 23 further includes, on a surface thereof closer to the second downstream process mold 22 (e.g., on the lower side in the vertical direction in the example of FIG. 8), the one or more (in the examples of the figures, the plurality of) intermediate plate projecting surfaces 231. The intermediate plate projecting surfaces 231 are configured to be arranged facing the second downstream process mold cavity surfaces 220 of the second downstream process mold 22 (FIG. 8). The intermediate plate projecting surface 231 are each configured in a projecting shape that protrudes toward the corresponding second downstream process mold cavity surface 220 (e.g., toward the lower side in the vertical direction in the example of FIG. 8). The intermediate plate projecting surface 231 is configured in a substantially hemispherical shape. The intermediate plate projecting surface 231 has the same shape as the intermediate plate cavity surface 230. The intermediate plate 23 further includes, on the surface thereof closer to the second downstream process mold 22 (e.g., on the lower side in the vertical direction in the example of FIG. 8), second flat surfaces 234, each of which continues from the corresponding intermediate plate projecting surface 231 to the outer side in the circumferential direction of the intermediate plate projecting surface 231 and extends parallel to the downstream process mold perpendicular-to-axis direction OPD. In the examples of the figures, each second flat surface 234 continuously extends over the entire circumference around the corresponding intermediate plate projecting surface 231, and continuously extends between adjacent intermediate plate projecting surfaces 231 so that the plurality of intermediate plate projecting surfaces 231 is coupled.

Figure 9:
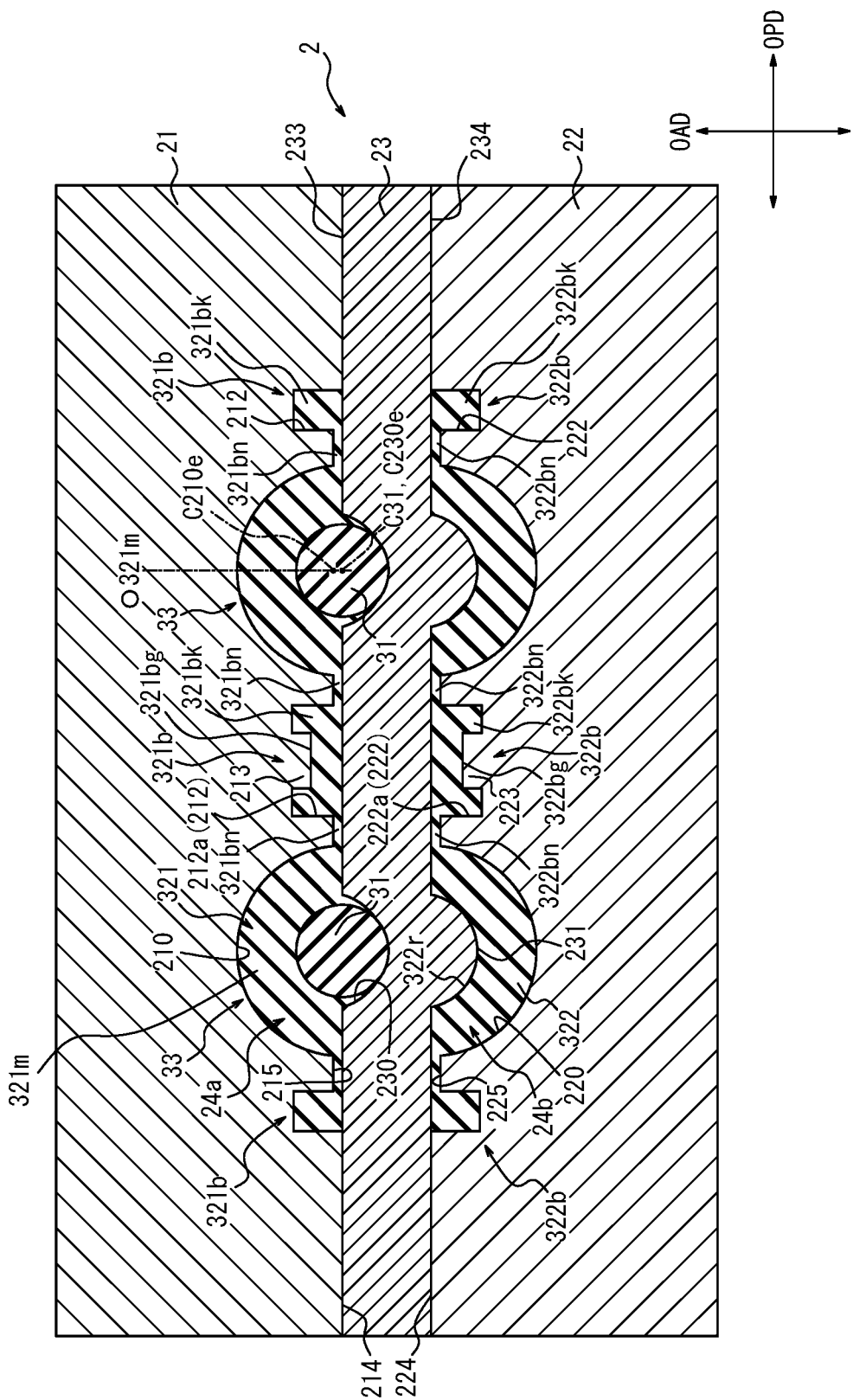
FIG. 9 illustrates a preparatory molding step in the downstream process of the multilayer core molding method according to the first embodiment of the present disclosure.
Figure 11:
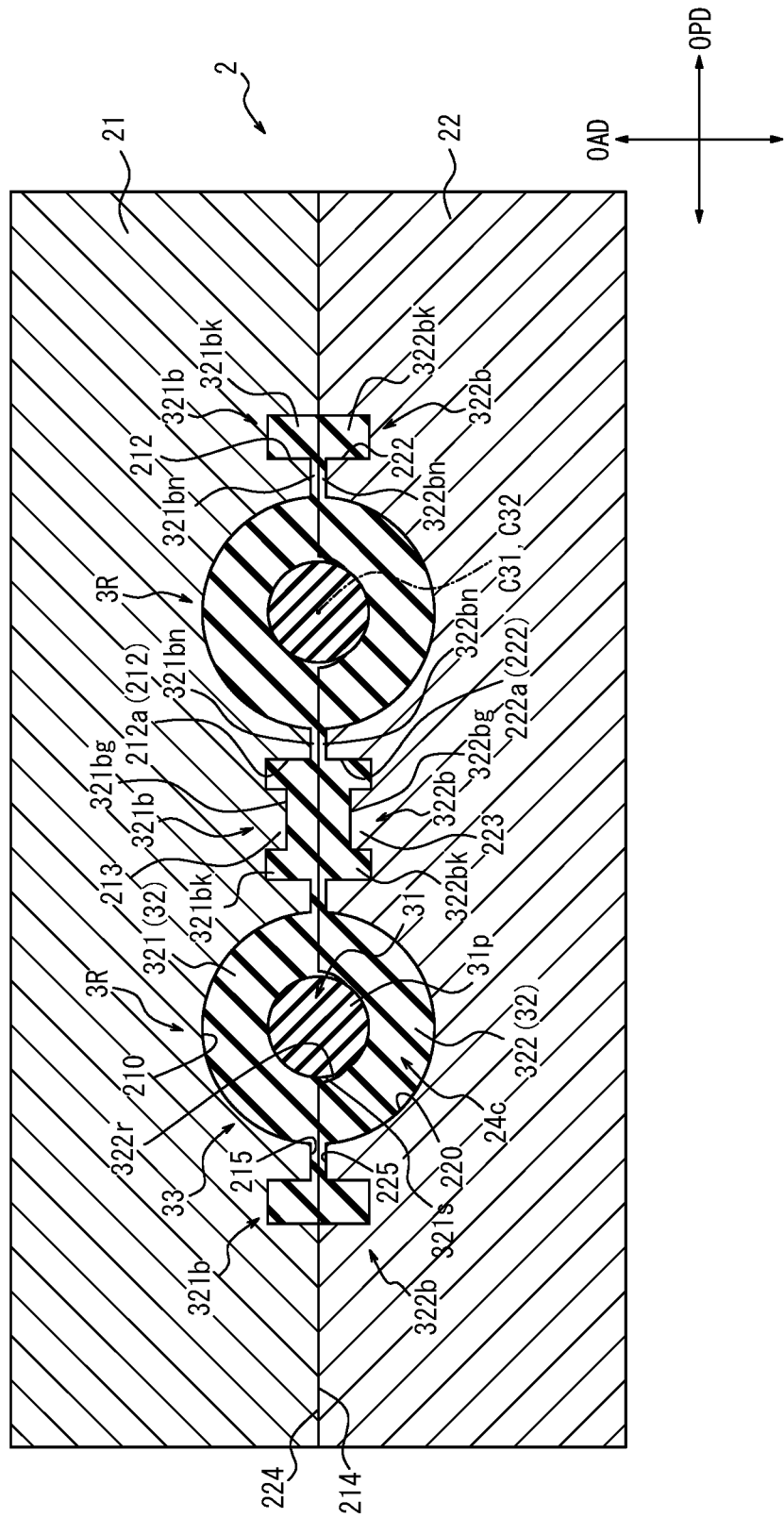
FIG. 11 illustrates a raw core forming step and a vulcanization step in the downstream process of the multilayer core molding method according to the first embodiment of the present disclosure.

The downstream process molding apparatus 2 is configured, in a state in which the first downstream process mold 21 and the intermediate plate 23 are closed against each other, to define first downstream process mold cavities 24a between the first downstream process mold cavity surfaces 210, and the intermediate plate cavity surfaces 230 and the surrounding first flat surfaces 233 (FIG. 9). Further, the downstream process molding apparatus 2 is configured, in a state in which the second downstream process mold 22 and the intermediate plate 23 are closed against each other, to define second downstream process mold cavities 24b between the second downstream process mold cavity surfaces 220, and the intermediate plate projecting surfaces 231 and the surrounding second flat surfaces 234 (FIG. 9). Moreover, the downstream process molding apparatus 2 is configured, in a state in which the first downstream process mold 21 and the second downstream process mold 22 are closed against each other directly without the intermediate plate 23, to define third downstream process mold cavities 24c between the first downstream process mold cavity surfaces 210 and the second downstream process mold cavity surfaces 220 (FIG. 11).

—Second Outer Core Arrangement Step—

In the second outer core arrangement step, the second outer core materials 322 are arranged on the second downstream process mold cavity surfaces 220 of the second downstream process mold 22, or the intermediate plate projecting surfaces 231 of the intermediate plate 23 (FIG. 7). In the example of FIG. 7, in the second outer core arrangement step, the second outer core materials 322 are arranged on the second downstream process mold cavity surfaces 220.

Here, the term "on" in "arranged on the second downstream process mold cavity surfaces 220 of the second downstream process mold 22, or the intermediate plate projecting surfaces 231 of the intermediate plate 23" refers to arrangement that causes contact with or close facing to the second downstream process mold cavity surfaces 220 or the intermediate plate projecting surfaces 231. Note that, however, when arranged on the second downstream process mold cavity surfaces 220, the second outer core materials 322 are preferably arranged to contact the second downstream process mold cavity surfaces 220. Further, when arranged on the intermediate plate projecting surfaces 231, the second outer core materials 322 preferably closely face the intermediate plate projecting surfaces 231.

An example of arranging the second outer core materials 322 on the intermediate plate projecting surfaces 231 will be described later with reference to FIG. 15.

The second outer core arrangement step may be performed before, in the course of, or after the above-described upstream process, and is preferably performed before or in the course of the upstream process because this reduces a total time required for the multilayer cores 3 to be molded. Further, the second outer core arrangement step may be performed before, in the course of, or after before the intermediate molded body arrangement step which will be described later, and is preferably performed before or in the course of the intermediate molded body arrangement step because this reduces the total time required for the multilayer cores 3 to be molded. Moreover, the second outer core arrangement step is more preferably performed immediately before the intermediate molded body arrangement step which will be described later, because this makes the vulcanized state of the second outer core materials 322 equivalent to the vulcanized state of the first outer core materials 321 of the intermediate molded bodies 33 arranged in the intermediate molded body arrangement step.

By being vulcanized in the subsequent vulcanization step, the second outer core materials 322 constitute part of the outer cores 32 included in the multilayer cores 3 (FIG. 14), the final products. The outer core 32 of each multilayer core 3 is formed of the first outer core material 321 and the second outer core material 322 described above. The second outer core materials 322 are rubber, as described above with respect to the outer cores 32.

The entire second outer core materials 322, in the second outer core arrangement step, are preferably in the unvulcanized state.

Additionally, the second outer core materials 322, in the second outer core arrangement step, may be at least partially in the semi-vulcanized state (in the case of the partially semi-vulcanized state, a remaining part of the second outer core materials 322 may be in the unvulcanized state).

In the example of FIG. 7, each second outer core material 322 is configured in a cylindrical shape in the second outer core arrangement step. In the second outer core arrangement step, however, the second outer core material 322 may be configured in any shape, such as a hemispherical, spherical, or a rectangular parallelepiped shape.

—Intermediate Molded Body Arrangement Step—

In the intermediate molded body arrangement step, which is performed after the above-described upstream process, the intermediate molded bodies 33 obtained in the upstream process are arranged on the intermediate plate cavity surfaces 230 of the intermediate plate 23, or the first downstream process mold cavity surfaces 210 of the first downstream process mold 21 (FIG. 8). In the example of FIG. 8, the intermediate molded bodies 33 are arranged on the intermediate plate cavity surfaces 230 in the intermediate molded body arrangement step.

Here, the term "on" in "arranged on the intermediate plate cavity surfaces 230 or the first downstream process mold cavity surfaces 210 of the first downstream process mold 21" refers to arrangement that causes contact with the intermediate plate cavity surfaces 230 or the first downstream process mold cavity surfaces 210.

An example of arranging the intermediate molded bodies 33 on the first downstream process mold cavity surfaces 210 will be described later with reference to FIG. 15.

In the intermediate molded body arrangement step, as illustrated in FIG. 8, the protruding portions 31$p$ of the inner cores 31, which are included in the intermediate molded bodies 33, are arranged facing the intermediate plate cavity surfaces 230, and the body portions 321$m$ of the first outer core materials 321, which are included in the intermediate molded bodies 33, are arranged facing the first downstream process mold cavity surfaces 210. This allows the protruding portions 31$p$ of the inner cores 31, which are included in the intermediate molded bodies 33, to face the second outer core materials 322 via the intermediate plate 23, after the second outer core arrangement step and the intermediate molded body arrangement step (FIG. 8). In the example of FIG. 8, in the intermediate molded body arrangement step, the intermediate molded bodies 33 are arranged on the intermediate plate cavity surfaces 230, so that the protruding portions 31$p$ of the inner cores 31 of the intermediate molded bodies 33 come into contact with the intermediate plate cavity surfaces 230 (in other words, so that the protruding portions 31$p$ are received in the cavities defined by the intermediate plate cavity surfaces 230).

—Preparatory Molding Step—

In the preparatory molding step, which is performed after the second outer core arrangement step and the intermediate molded body arrangement step, the second outer core materials 322 and the intermediate molded bodies 33 are compression-molded in a state in which the first downstream process mold 21, the second downstream process mold 22, and the intermediate plate 23 are closed against each other (FIG. 9).

Additionally, the process of closing the second downstream process mold 22 and the intermediate plate 23 against each other may be performed at any time after the second outer core arrangement step and before the preparatory molding step. Further, the process of closing the first downstream process mold 21 and the intermediate plate 23 against each other may be performed at any time after the intermediate molded body arrangement step and before the preparatory molding step.

In the preparatory molding step, the second outer core materials 322 are compression-molded in the second downstream process mold cavities 24$b$ between the second downstream process mold cavity surfaces 220, and the intermediate plate projecting surfaces 231 and the surrounding second flat surfaces 234. Each second downstream process mold cavity surface 220 molds a substantially hemispherical outer surface in the corresponding second outer core material 322. Each intermediate plate projecting surface 231 molds a substantially hemispherical inner surface 322$r$ in the corresponding second outer core material 322.

Further, in the preparatory molding step, the intermediate molded bodies 33 (specifically, the first outer core materials 321) are compression-molded in the first downstream process mold cavities 24$a$ between the first downstream process mold cavity surfaces 210, and the intermediate plate cavity surfaces 230 and the surrounding first flat surfaces 233. Each first downstream process mold cavity surface 210 forms a substantially hemispherical outer surface in the first outer core material 321 of the corresponding intermediate molded body 33.

—Intermediate Plate Removal Step—

In the intermediate plate removal step, which is performed after the preparatory molding step, the first downstream process mold 21, the second downstream process mold 22, and the intermediate plate 23 are released from each other, and the intermediate plate 23 is removed from the downstream process molding apparatus 2 (FIG. 10).

—Raw Core Forming Step—

In the raw core forming step, which is performed after the intermediate plate removal step, the second outer core materials 322 are assembled to the intermediate molded bodes 33 to form raw multilayer cores 3R (FIG. 11).

In the raw core forming step, the protruding portions 31$p$ of the inner cores 31 of the intermediate molded bodies 33 are fitted to the inner surfaces 322$r$ of the second outer core materials 322 (in other words, the protruding portions 31$p$ are received in the cavities defined by the inner surfaces 322$r$ of the second outer core materials 322), and the first outer core materials 321 and the second outer core materials 322 of the intermediate molded bodies 33 are combined to form the outer cores 32.

Each raw multilayer core 3R includes the inner core 31, and the outer core 32, which is arranged on the outer side in the circumferential direction of the inner core 31. The outer core 32 covers the entire surface of the inner core 31. The outer core 32 is formed of the first outer core material 321, which is included in the intermediate molded body 33, and the second outer core material 322.

Note that the term "raw" in the "raw multilayer core 3R" means that at least part of the raw multilayer core 3R (specifically, the outer core 32) is in the unvulcanized and/or semi-vulcanized state.

—Vulcanization Process—

In the vulcanization step, which is performed after the raw core forming step, the raw multilayer cores 3R are vulcanized in the state in which the first downstream process mold 21 and the second downstream process mold 22 are closed against each other (FIG. 11).

Additionally, the process of closing the first downstream process mold 21 and the second downstream process mold 22 against each other may be performed at any time in the course of the raw core forming step, or after the raw core forming step and before the vulcanization step. In the example of FIG. 10, the process of closing the first downstream process mold 21 and the second downstream process mold 22 against each other is performed in the course of the raw core forming step (FIG. 11).

In the vulcanization process, the raw multilayer cores 3R are vulcanization-molded in the third downstream process mold cavities 24c between the first downstream process mold cavity surfaces 210 and the second downstream process mold cavity surfaces 220.

By vulcanization-molding the raw multilayer cores 3R in the vulcanization step, the vulcanized multilayer cores 3 are formed.

—Multilayer Core Removal Step—

Figure 12:
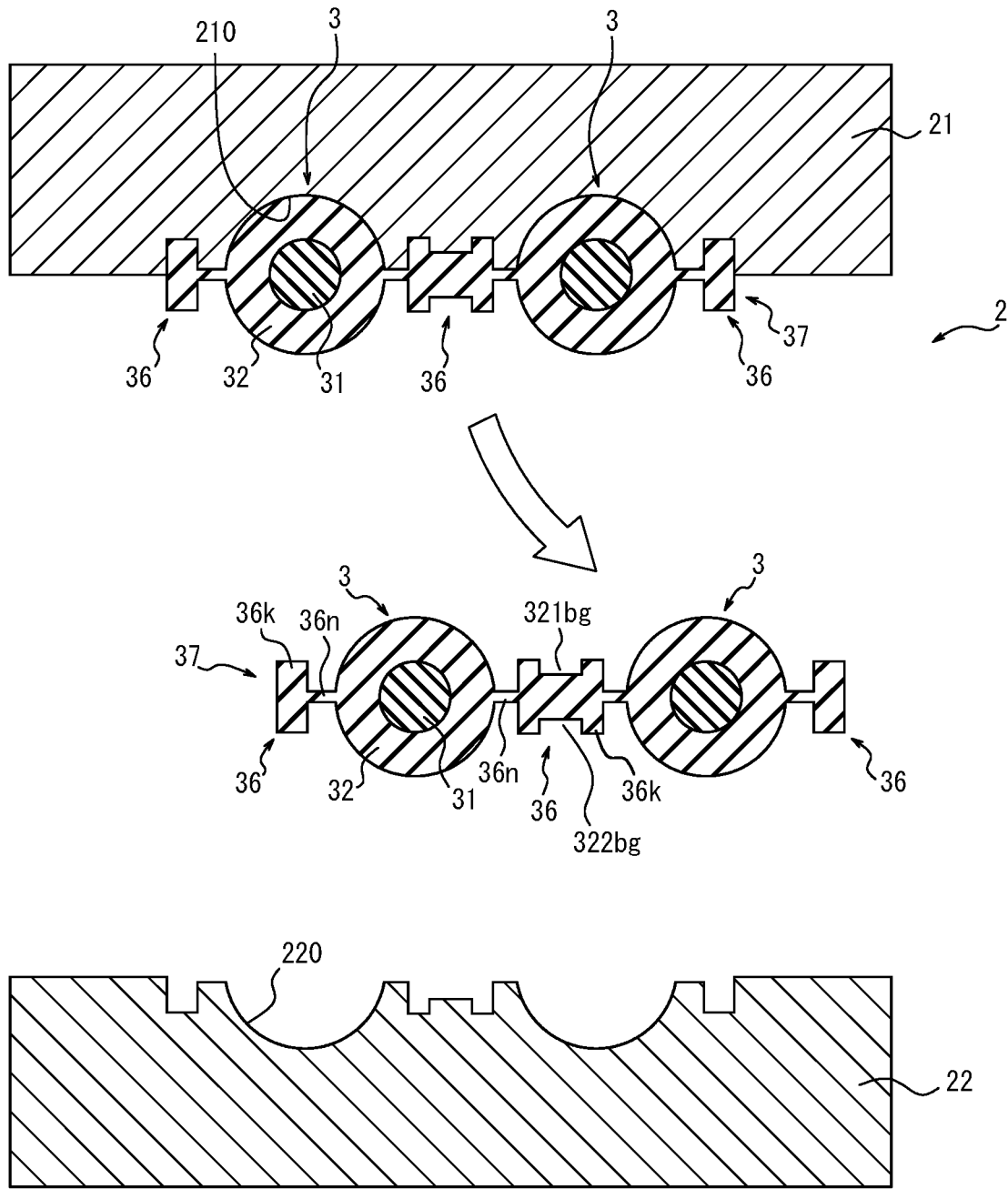
FIG. 12 illustrates a multilayer core removal step in the downstream process of the multilayer core molding method according to the first embodiment of the present disclosure.
Figure 13:
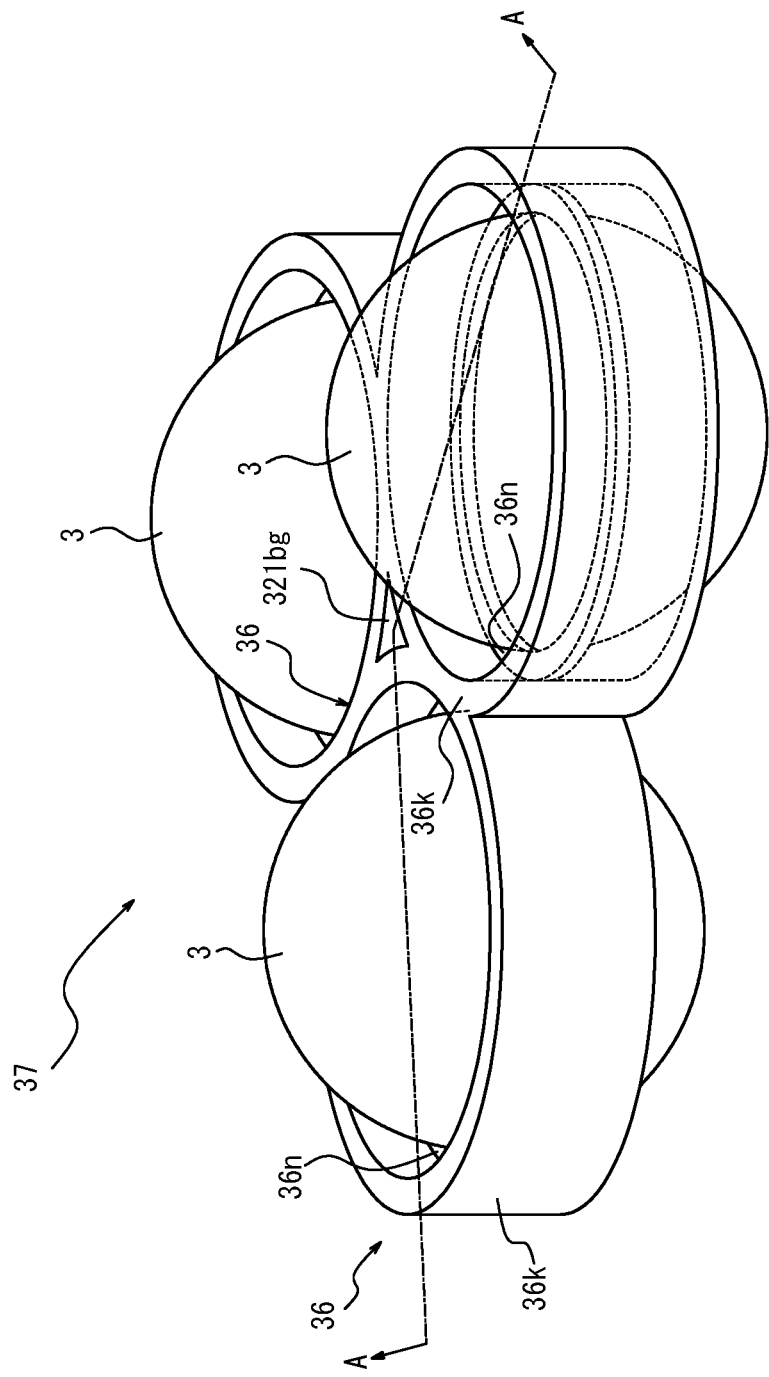
FIG. 13 is a perspective view of a continuous molded body including multilayer cores of FIG. 12.

In the multilayer core removal step, which is performed after the vulcanization step, the first downstream process mold 21 and the second downstream process mold 22 are released from each other, and the multilayer cores 3 formed in the vulcanization step are removed from the downstream process molding apparatus 2 (FIGS. 12 and 13). FIG. 13 illustrates the multilayer cores 3 removed in the multilayer core removal step.

In the examples of FIGS. 12 and 13, the plurality of multilayer cores 3 is coupled to each other by joining flashes 36, which will be described later. A section of the multilayer cores 3 and the joining flashes 36 in FIG. 12 corresponds to a section taken along the line A-A in FIG. 13. The joining flashes 36 are removed after the multilayer core removal step (in a flash removal step). Subsequently, the individual multilayer cores 3 are finally obtained.

The above-described upstream process and the downstream process are conducted to finally obtain the multilayer cores 3 (FIG. 14).

Now, operational advantages of the present embodiment will be described.

As described above, the multilayer core molding method of the present embodiment includes, in the upstream process, the inner core arrangement step (FIGS. 1 and 2) of arranging the vulcanized inner cores 31 on the second upstream process mold cavity surfaces 120 of the upstream process molding apparatus 1, and the covering step (FIGS. 3 and 4), performed after the inner core arrangement step, of covering the inner cores 31 with the first outer core materials 321 to thereby obtain the intermediate molded bodies 33. Further, the intermediate molded bodies 33 obtained in the covering step (FIGS. 3 and 4) each include the inner core 31, and the unvulcanized or semi-vulcanized first outer core material 321 that covers only part of the surface of the inner core 31 and is integrated with the inner core 31. Moreover, the multilayer core molding method of the present embodiment includes, in the downstream process, the second outer core arrangement step (FIG. 7) of arranging the second outer core materials 322 on the second downstream process mold cavity surfaces 220 or the intermediate plate projecting surfaces 231, the intermediate molded body arrangement step (FIG. 8) of arranging the intermediate molded bodies 33 on the intermediate plate cavity surfaces 230 or the first downstream process mold cavity surfaces 210, and the preparatory molding step (FIG. 9), performed after the second outer core arrangement step (FIG. 7) and the intermediate molded body arrangement step (FIG. 8), of compression-molding the second outer core materials 322 and the intermediate molded bodies 33 in the state in which the first downstream process mold 21, the second downstream process mold 22, and the intermediate plate 23 are closed against each other.

In this regard, suppose that the inner cores 31 and the unvulcanized or semi-vulcanized first outer core materials 321, in a state of being discrete from each other (i.e., in a state of not being integrated [adhered] to each other), are stacked to be arranged on cavity surfaces of the downstream process molding apparatus 2. In this circumstance, since the first outer core materials 321 are discrete from the inner cores 31, the first outer core materials 321, when being arranged, are likely to be inclined or misaligned with respect to to the inner cores 31 (and thus with respect to the cavity surfaces). When the first outer core materials 321 are inclined or misaligned with respect to the inner cores 31, the first outer core materials 321 are unlikely to flow evenly around the inner cores 31 in a subsequent step (e.g., the preparatory molding step), and this increases the potential of the eccentricity in the inner cores 31 of the multilayer cores 3 (FIG. 14). Further, in this circumstance, since being discrete from the inner cores 31, the first outer core materials 321 have a shape that is likely to deform gradually over time due to residual stress of the rubber that forms the first outer core materials 321, and thus, the first outer core materials 321, when being arranged, are even more likely to be inclined or misaligned with respect to the inner cores 31 (and thus with respect to the cavity surfaces). This, in turn, further increases the potential of the eccentricity in the inner cores 31 of the multilayer cores 3 (FIG. 14).

Herein, the eccentricity in the inner cores 31 refers to that a center C31 of the inner core 31 of any multilayer core 3 (FIG. 14) finally obtained is misaligned from a center C32 of the outer core 32.

In contrast, the present embodiment forms the intermediate molded bodies 33 in advance in the covering step by integrating the first outer core materials 321 to the inner cores 31, before arranging the inner cores 31 and the first outer core materials 321 on the cavity surfaces (specifically, the intermediate plate cavity surfaces 230 or the first downstream process mold cavity surfaces 210) of the downstream process molding apparatus 2. Accordingly, when the inner cores 31 and the first outer core materials 321 are subsequently arranged on the cavity surfaces of the downstream process molding apparatus 2, the first outer core materials 321 are prevented from being inclined or misaligned with respect to the inner cores 31 (and thus with respect to the cavity surfaces), and this prevents the potential of the eccentricity in the inner cores 31 of the multilayer cores 3. Further, according to the present embodiment, the inner cores 31, which are integrated on the inner side in the circumferential direction of the first outer core materials 321, prevent the first outer core materials 321 of the intermediate molded bodies 33 from deforming due to the residual stress, thereby preventing the first outer core materials 321 from being inclined or misaligned with respect to the inner cores 31. This, in turn, further prevents the eccentricity in the inner cores 31 of the multilayer cores 3.

Further, as described above, the preparatory molding step (FIG. 9) of compression-molding the first outer core materials 321 in the first downstream process mold cavities 24*a* in the state in which the protruding portions 31*p* of the inner cores 31 in the intermediate molded bodies 33 are received in the cavities defined by the intermediate plate cavity surfaces 230 prevents the inner cores 31 from being misaligned in the first downstream process mold cavities 24*a*. This, in turn, prevents the eccentricity in the inner cores 31.

Hereinafter, more detailed explanation, preferred configurations, modifications, etc., of the multilayer core molding method of the present disclosure will be described.

Figure 15:
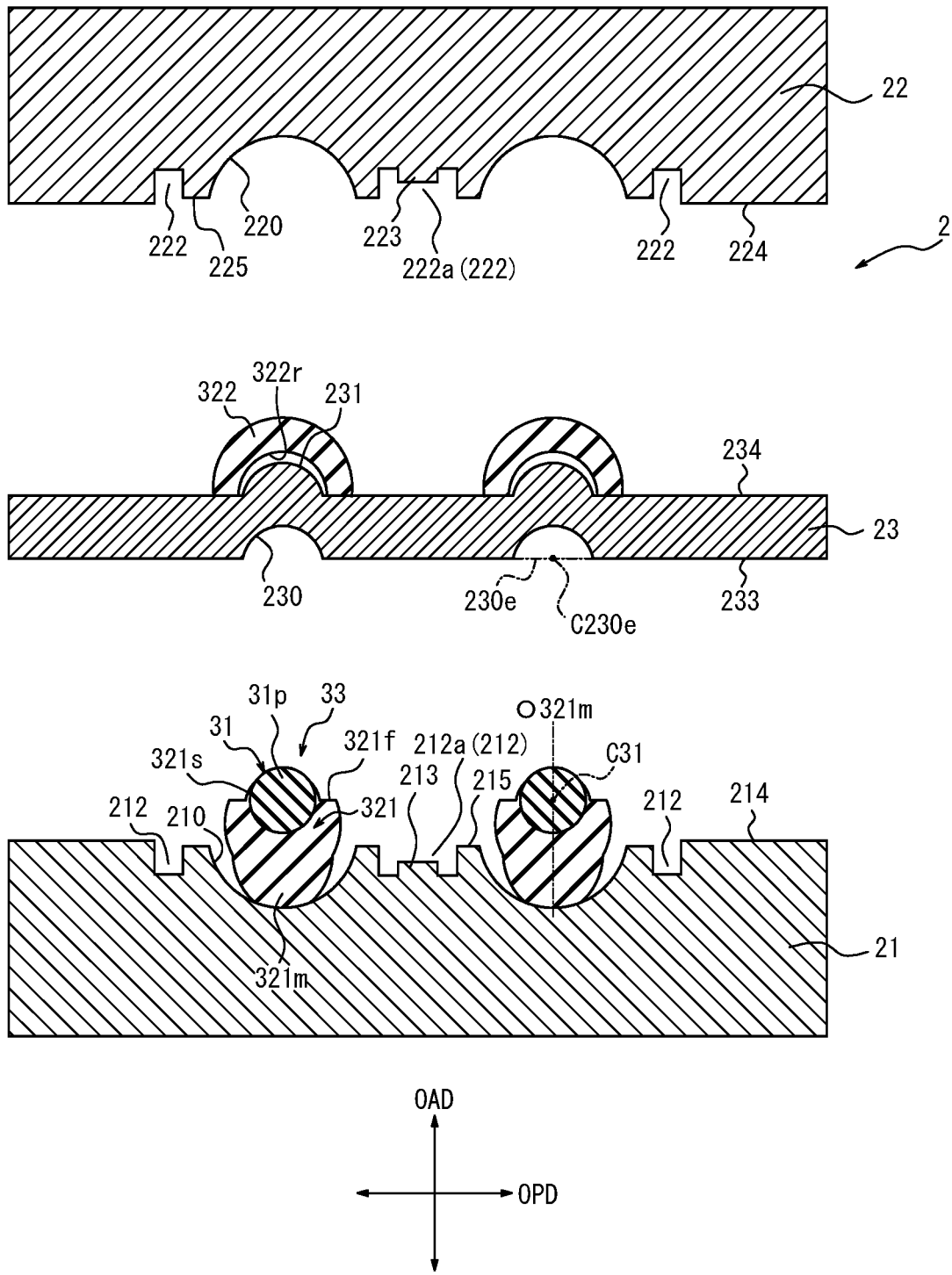
FIG. 15 illustrates the second outer core arrangement step and the intermediate molded body arrangement step in the downstream process of the multilayer core molding method according to a second embodiment of the present disclosure.

In the examples described herein, in the downstream process molding apparatus 2 as described above, the first downstream process mold 21, the intermediate plate 23, and the second downstream process mold 22 may be configured, as in a second embodiment illustrated in FIG. 15, to be disposed along the vertical direction, and the second downstream process mold 22 may be configured to be positioned on the upper side in the vertical direction with respect to the first downstream process mold 21.

In this case, in the downstream process, the second outer core materials 322 are preferably arranged on the intermediate plate projecting surfaces 231 of the intermediate plate 23 in the second outer core arrangement step, and the intermediate molded bodies 33 are preferably arranged on the first downstream process mold cavity surfaces 210 of the first downstream process mold 21 in the intermediate molded body arrangement step.

In this case, each second outer core material 322 arranged in the second outer core arrangement step may have any shape. Preferably, however, the second outer core material 322 includes, for example, the substantially hemispherical inner surface 322*r* and is arranged so that the inner surface 322*r* covers the corresponding intermediate plate projecting surface 231, whether out of or in contact, because this allows stable arrangement of the second outer core material 322.

Further, in this case, in the intermediate molded body arrangement step as illustrated in FIG. 15, the protruding portions 31*p* of the inner cores 31 in the intermediate molded bodies 33 are arranged facing the intermediate plate cavity surfaces 230, and the body portions 321*m* of the first outer core materials 321 in the intermediate molded bodies 33 are arranged facing the first downstream process mold cavity surfaces 210. More specifically, in the intermediate molded body arrangement step, the intermediate molded bodies 33 are preferably arranged on the first downstream process mold cavity surfaces 210, so that the main body portions 321*m* of the first outer core materials 321 in the intermediate molded bodies 33 come into contact with the first downstream process mold cavity surfaces 210 (in other words, so that the body portions 321*m* are received in the cavities defined by the first downstream process mold cavity surfaces 210).

In the examples described herein, as in the example illustrated in FIG. 2, each second upstream process mold cavity surface 120 in the upstream process molding apparatus 1 preferably includes a substantially hemispherical receiving recessed surface portion 121, which defines the cavity configured to receive the corresponding inner core 31. Since the receiving recessed surface portion 121 is configured in a substantially hemispherical shape, the inner core 31 is positioned without difficulty by simply arranged on the receiving recessed surface portion 121 in the inner core arrangement step. This, in turn, prevents the eccentricity in the inner cores 31.

In this case, as illustrated in FIG. 4, the receiving recessed surface portion 121 of each second upstream process mold cavity surface 120 in the upstream process molding apparatus 1 does not mold the outer surface of the body portion 321*m* of the corresponding first outer core material 321 in the covering step in the upstream process. The outer surface of the body portion 321*m* of the first outer core material 321 is molded at least by part of the second upstream process mold cavity surface 120 other than the receiving recessed surface portion 121.

Note that the term "substantially hemispherical" herein refers to a perfectly hemispherical shape, or a shape that is not perfectly hemispherical but close to hemispherical.

In the examples described herein, as in the examples illustrated in FIGS. 1 to 6, the covering step in the upstream process preferably uses extrusion molding to cover the inner cores 31 with the first outer core materials 321. In this case, the upstream process molding apparatus 1 is configured to have a function as an extrusion molding machine. As illustrated in FIGS. 1 and 3, for example, the upstream process molding apparatus 1 having the function as the extrusion molding machine preferably includes, in the first upstream process mold 11, a storage 16 storing the first outer core material 321, a pressing member 15 configured to press the first outer core material 321 stored in the storage 16 toward the upstream process mold cavities 14 (FIG. 3), and one or more (e.g., in the examples of the figures, a plurality of) extrusion ports 17 arranged between the storage 16 and the upstream process mold cavities 14. In this case, in the covering step, firstly, the first upstream process mold 11 and the second upstream process mold 12 in the upstream process molding apparatus 1 are closed against each other. Secondly, the first outer core material 321 stored in advance in the storage 16 is pressed toward the upstream process mold cavities 14 by the pressing member 15. Being pressed by the pressing member 15, the first outer core material 321 is extruded into the upstream process mold cavities 14 through the one or more extrusion ports 17. The first outer core materials 321, after being extruded into the upstream process mold cavities 14, cover the inner cores 31 so that only part of the surface of each inner core 31 is covered. As in the example of FIG. 3, the first outer core material 321 is extruded into the upstream process mold cavities 14 preferably in the upstream process mold axial direction EAD.

However, the covering step may also use compression molding to cover the inner cores 31 with the first outer core materials 321. In this case, the upstream process molding apparatus 1 is configured to have a function as a compression molding machine. In this case, for example, in the covering step, firstly, in a state in which the first upstream process mold 11 and the second upstream process mold 12 in the upstream process molding apparatus 1 are released from each other, the first outer core materials 321 of any shape may be arranged between the inner cores 31 on the second upstream process mold cavity surfaces 120 and the first upstream process mold cavity surfaces 110, and subsequently, the first upstream process mold 11 and the second upstream process mold 12 may be closed against each other to thereby compression-mold the first outer core materials 321 in the upstream process mold cavities 14. Thus, the first outer core materials 321 cover the inner cores 31 so that only part of the surface of each inner core 31 is covered.

In the examples described herein, in the covering step in the upstream process, as an example illustrated in FIG. 4, the inner cores 31 are preferably covered with the first outer core materials 321 inside the upstream process mold cavities 14, in the state in which the first upstream process mold 11 and the second upstream process mold 12 are closed against each other. This permits each first outer core material 321 to achieve a shape, a position with respect to the corresponding inner core 31, or the like, as desired, compared with a case of the covering step using, for example, extrusion molding, assuming that the inner cores 31 are covered with the first outer core materials 321 in the state in which the first upstream process mold 11 and the second upstream process mold 12 are released from each other. Accordingly, the eccentricity in the inner cores 31 may be prevented.

In this case and when the upstream process molding apparatus 1 includes the receiving recessed surface portion 121 in each second upstream process mold cavity surface 120, the outer surface of the body portion 321m of the first outer core material 321, in the covering step, is molded by part of the second upstream process mold cavity surface 120 other than the receiving recessed surface portion 121 and the first upstream process mold cavity surface 110 inside the corresponding upstream process mold cavity 14.

Further, in this case and when the upstream process molding apparatus 1 includes the receiving recessed surface portion 121 in each second upstream process mold cavity surface 120, as illustrated in FIG. 4, the upstream process molding apparatus 1 is preferably configured to allow a central axis O14 (or an extension thereof, which similarly applies hereinafter) of the upstream process mold cavity 14 to pass through a center C121e of an open end surface 121e of the receiving recessed surface portion 121 of the second upstream process mold cavity surface 120, in the state in which the first upstream process mold 11 and the second upstream process mold 12 are closed against each other. Herein, the opening end surface 121e of the receiving recessed surface portion 121 is a circular imaginary surface. The central axis O14 of the upstream process mold cavity 14 is preferably parallel to the upstream process mold axial direction EAD.

The above configuration facilitates a central axis O321m of the body portion 321m of the first outer core material 321 to pass through the center C31 of the inner core 31 (FIG. 4) in the intermediate molded body 33 obtained by the covering step. This, in turn, facilitates the intermediate molded body 33 to be arranged, with the central axis O321m of the body portion 321m of the first outer core material 321 being parallel to the downstream process mold axial direction OAD and passing through the center C230e of the opening end surface 230e of the intermediate plate cavity surface 230, when the protruding portion 31p of the intermediate molded body 33 is received in the cavity defined by the corresponding intermediate plate cavity surface 230 of the intermediate plate 23 in a subsequent step (e.g., in the example of FIG. 8, in the intermediate molded body arrangement step, and in the example of FIG. 15, when the first downstream process mold 21 and the intermediate plate 23 are closed against each other after the intermediate molded body arranging step and before the preparatory molding process), thereby preventing the eccentricity in the inner cores 31. Herein, the opening end surface 230e of the intermediate plate cavity surface 230 is a circular imaginary surface.

Similarly, as in the example illustrated in FIG. 4, the upstream process molding apparatus 1 is preferably configured to allow the central axis O14 of the upstream process mold cavity 14 to pass through the center C31 of the inner core 31 arranged on the second upstream process mold cavity surface 120 (more specifically, in the example of FIG. 4, the receiving recessed surface portion 121), in the state in which the first upstream process mold 11 and the second upstream process mold 12 are closed against each other.

The above configuration facilitates the central axis O321m of the body portion 321m of the first outer core material 321 to pass through the center C31 of the inner core 31 (FIG. 4) in the intermediate molded body 33 obtained by the covering step, thereby preventing the eccentricity in the inner cores 31.

In the examples described herein, as in the example illustrated in FIG. 4, when each second upstream process mold cavity surface 120 has the receiving recessed surface portion 121 in the upstream process molding apparatus 1, the second upstream process mold cavity surface 120 preferably includes a flat surface portion 122 (FIG. 4), which continues from the receiving recessed surface portion 121 (specifically, the opening end surface 121e of the receiving recessed surface portion 121) toward the outer side in the circumferential direction and which extends parallel and flat with respect to the upstream process mold perpendicular-to-axis direction EPD. The flat surface portion 122 preferably extends annularly over the entire circumference around the receiving recessed surface portion 121. In this case, the flat surface portion 122 of the second upstream process mold cavity surface 120 forms a flat surface portion 321f (FIGS. 4 and 6) on the body portion 321m of the first outer core material 321 of the intermediate molded body 33 in the covering step in the upstream process. The flat surface portion 321f constitutes an end surface of the body portion 321m of the first outer core material 321 of the intermediate molded body 33 that is located at one end in the axial direction (i.e., direction parallel to the central axis O321m). Part of the inner core 31 of the intermediate molded body 33 that is located beyond the flat surface portion 321f and closer to the one end of the main body 321m of the first outer core material 321 in the axial direction constitutes the protruding portion 31p, and a remainder that is located beyond the flat surface portion 321f and closer to another end of the main body 321m of the first outer core material 321 in the axial direction is buried inside the main body 321m of the first outer core material 321.

With the above configuration, when the protruding portion 31p of the intermediate molded body 33 is received in the cavity defined by the corresponding intermediate plate cavity surface 230 of the intermediate plate 23 in a subsequent step (e.g., in the example of FIG. 8, in the intermediate molded body arrangement step, and in the example of FIG. 15, when the first downstream process mold 21 and the intermediate plate 23 are closed against each other after the intermediate molded body arranging step and before the preparatory molding process), the flat surface portion 321f of the first outer core material 321 of the intermediate molded body 33 is brought into contact with the first flat surface 233 of the intermediate plate 23, whereby the position and orientation of the intermediate molded body 33 can be easily and reliably adjusted so that the flat surface portion 321f of the first outer core material 321 is parallel to the first flat surface 233 of the intermediate plate 23 (and thus is parallel to the downstream process mold perpendicular-to-axis direction OPD). This facilitates the central axis O321m of the first outer core material 321 of the intermediate molded body 33 to be parallel to the downstream process mold axial direction OAD, thereby preventing the eccentricity in the inner cores 31.

In the examples described in this specification, as in the example illustrated in FIG. 2, when each second upstream process mold cavity surface 120 in the second upstream process mold 12 includes the substantially hemispherical receiving recessed surface portion 121 that defines the cavity configured to receive the corresponding inner core 31 in the upstream process molding apparatus 1, a diameter D1 of the open end surface 121e of the receiving recessed surface portion 121 is preferably larger than a diameter D2 of the inner core 31. In this case, a gap 121g is formed between the receiving recessed surface portion 121 and the inner core 31 in a state in which the inner core 31 is received in the cavity defined by the receiving recessed surface portion 121 through the inner core arrangement step in the upstream process.

Consequently, even when the dimensional accuracy of the inner core 31 prepared in advance is not as high as expected and the inner core 31 is not perfectly spherical, the inner core 31 may be easily arranged in the inner core arrangement step so that the center C31 of the inner core 31 is positioned at the center C121e of the opening end surface 121e of the receiving recessed surface portion 121 or faces to the center C121e of the opening end surface 121e in the upstream process mold axial direction EAD, simply by dropping the inner core 31 onto the receiving recessed surface portion 121. This prevents the eccentricity in the inner cores 31.

Further, the above configuration results in formation of a thin portion 321s in the subsequent covering step, since part of the first outer core material 321 enters the gap 121g (FIGS. 4 and 6). In this case, the first outer core material 321 of the intermediate molded body 33 includes the thin portion 321s, in addition to the body portion 321m. The thin portion 321s is continuous from the body portion 321m and extends on the surface of the protruding portion 31p of the inner core 31 away from the body portion 321m. The thin portion 321s covers only part of the surface of the protruding portion 31p of the inner core 31. Due to the thin portion 321s formed in the covering step, the inner core 31 is held not only by the body portion 321m of the first outer core material 321 but also by the thin portion 321s, and the degree of adhesion between the inner core 31 and the first outer core material 321 may be increased. This, in turn, effectively prevents the first outer core material 321 from being misaligned or detached from the inner core 31 in the covering step or in a subsequent step. Accordingly, durability of the multilayer cores 3 may be improved, and the eccentricity in the inner cores 31 may be prevented.

In this case, in the downstream process molding apparatus 2, the cavity defined by each intermediate plate cavity surface 230 of the intermediate plate 23 (FIGS. 8 and 15) is preferably configured to receive the protruding portion 31p of the inner core 31 of the corresponding intermediate mold 33 and the surrounding thin portion 321s. From this perspective, in the downstream process molding apparatus 2, a diameter of the opening end surface 230e (FIGS. 8 and 15) of the intermediate plate cavity surface 230 of the intermediate plate 23 is preferably larger than the diameter D2 of the inner core 31.

Preferably, the diameter D1 of the open end surface 121e of the receiving recessed surface portion 121 in the upstream process molding apparatus 1 is from 102 to 105% of the diameter D2 of the inner core 31.

Similarly, the diameter of the open end surface 230e of the intermediate plate cavity surface 230 of the intermediate plate 23 of the downstream process molding apparatus 2 is preferably 102 to 105% of the diameter D2 of the inner core 31. Further, the diameter of the open end surface 230e of the intermediate plate cavity surface 230 of the intermediate plate 23 of the downstream process molding apparatus 2 is preferably equal to the diameter D1 of the open end surface 121e of the receiving recessed surface portion 121 in the upstream process molding apparatus 1.

However, in the examples described herein, the diameter D1 of the open end surface 121e of the receiving recessed surface portion 121 may be equal to (or substantially equal to) the diameter D2 of the inner core 31. In this case, the gap 121g is not formed between the receiving recessed surface portion 121 and the inner core 31 in the state in which the inner core 31 is received in the cavity defined by the receiving recessed surface portion 121 through the inner core arrangement step (FIG. 2), and the thin portion 321s is not formed in the subsequent covering step (FIG. 4). Accordingly, the first outer core material 321 of the intermediate molded body 33 obtained by the covering step does not include the thin portion 321s but only includes the body portion 321m. In this case, the diameter of the open end surface 230e of the intermediate plate cavity surface 230 of the intermediate plate 23 in the downstream process molding apparatus 2 is preferably equal to (or substantially equal to) the diameter D2 of the inner core 31.

Additionally, in the examples described herein, the diameter D1 of the open end surface 121e of the receiving recessed surface portion 121 may be smaller than the diameter D2 of the inner core 31.

In the examples described herein, as in the example illustrated in FIG. 2, when, in the upstream process molding apparatus 1, each second upstream process mold cavity surface 120 of the second upstream process mold 12 includes the substantially hemispherical receiving recessed surface portion 121 that defines the cavity configured to receive the corresponding inner core 31, a depth of the receiving recessed surface portion 121 may be equal to (or substantially equal to), smaller than, or larger than a radius (half the diameter D2) of the inner core 31.

Herein, the "depth of the receiving recessed surface portion (121)" refers to a distance from a deepest point of the receiving recessed surface portion 121 (i.e., a point farthest from the opening end surface 121e of the receiving recessed surface portion 121) to the opening end surface 121e of the receiving recessed surface portion 121.

The depth of the receiving recessed surface portion 121 will correspond to a height of the protruding portion 31p of the inner core 31 of the intermediate molded body 33 obtained in the covering step. The smaller the depth of the receiving recessed surface portion 121, the smaller the height of the protruding portion 31p of the inner core 31 of the intermediate molded body 33, and thus, the larger the part of the surface of the inner core 31 in the intermediate molded body 33 that is covered by the body portion 321m of the first outer core material 321.

From the perspective of increasing the degree of adhesion between the body portion 321m of the first outer core material 321 of the intermediate molded body 33, and the inner core 31, and thus improving the durability of the multilayer core 3, the depth of the receiving recessed surface portion 121 is preferably equal to (or substantially equal to) or smaller than the radius of the inner core 31, more preferably smaller than the radius of the inner core 31.

On the other hand, from the perspective of ease of positioning the intermediate molded body 33 in the downstream process or ease of molding or the like in the downstream process, the depth of the receiving recessed surface portion 121 is preferably substantially equal to (more preferably, equal to) the radius of the inner core 31 as in the example of FIG. 2. In this case, the body portion 321m of the first outer core material 321 of the intermediate molded body 33 obtained by the covering step will cover substantially half the surface of the inner core 31 (FIG. 4).

In the examples described herein, at least part of the first outer core material 321 that is located on the inner side in the circumferential direction in each intermediate molded body 33 obtained in the covering step in the upstream process is preferably in the unvulcanized or the semi-vulcanization state. This increases the degree of adhesion between the first outer core material 321 and the inner core 31, thereby effectively preventing the first outer core material 321 from being misaligned or detached from the inner core 31 in a subsequent step. Accordingly, the durability of the multi-layer cores 3 may be improved, and the eccentricity in the inner cores 31 may be prevented.

In the examples described herein, part of the first outer core material 321 that is located on the outer side in the circumferential direction in the intermediate molded body 33 obtained in the covering step is preferably in the semi-vulcanized state. This allows the part of the first outer core material 321 that is located on the outer side in the circumferential direction to be moderately cured, whereby the shape, the position or the orientation with respect to the inner core 31, or the like of the first outer core material 321 may be effectively maintained until immediately before the subsequent preparatory molding step. Accordingly, the eccentricity in the inner cores 31 may be prevented.

In the examples described herein, the first outer core material 321 of the intermediate molded body 33 obtained in the covering step preferably does not include a vulcanized part.

In the examples described herein, in the covering step in the upstream process, a temperature of the upstream process molding apparatus 1 is preferably higher than a temperature of each first outer core material 321. More specifically, at a beginning of the covering step (i.e., when the first outer core material 321 starts to cover the corresponding inner core 31), the temperature of the upstream process molding apparatus 1 is preferably higher than the temperature of the first outer core material 321. Further, throughout the covering step, the temperature of the upstream process molding apparatus 1 is preferably higher than the temperature of the first outer core material 321.

Additionally, as described above, the entire first outer core material 321 of the intermediate molded body 33 obtained in the covering step is preferably in the unvulcanized state.

From a similar perspective, the temperature of the upstream process molding apparatus 1 is preferably, for example, 50 to 80° C. in the covering step (more specifically, for example, at the beginning of the covering step, or throughout the covering step). Further, from the similar perspective, the temperature of the first outer core material 321 is preferably, for example, 40 to 60° C., in the covering step (more specifically, for example, at the beginning of the covering step, or throughout the covering step).

Note that these temperatures are particularly preferred when the covering step is carried out by extrusion, as in the examples of FIGS. 3 and 4.

Further, from the similar perspective, when the covering step is performed in the state in which the first upstream process mold 11 and the second upstream process mold 12 in the upstream process molding apparatus 1 are closed against each other, as in the example of FIGS. 3 and 4, it is preferable to maintain the state in which the first upstream process mold 11 and the second upstream process mold 12 in the upstream process molding apparatus 1 are closed against each other for, for example, 20 to 40 seconds in the covering step, and subsequently perform the intermediate molded body removal step.

In the examples described herein, in the preparatory molding step (FIG. 9) in the downstream process, in the state in which the first downstream process mold 21 and the intermediate plate 23 are closed against each other as in the example of FIG. 9, it is preferable that the central axis O321m of the body portion 321m of the first outer core material 321 in each intermediate molded body 33 is parallel to the downstream process mold axial direction OAD and also passes through the center C230e of the opening end surface 230e of the corresponding intermediate plate cavity surface 230, the center C31 of the inner core 31, and a center C210e of an opening end surface 210e of the first downstream process mold cavity surface 210 (FIG. 8). This prevents the eccentricity in the inner cores 31. Herein, the opening end surface 210e of the first downstream process mold cavity surface 210 (FIG. 8) is a circular imaginary surface.

In the examples described herein, the intermediate plate removal step (FIG. 10) in the downstream process, while the first downstream process mold 21, the second downstream process mold 22, and the intermediate plate 23 in the downstream process molding apparatus 2 are released from each other and the intermediate plate 23 is removed from the downstream process molding apparatus 2, as in the example of FIG. 10, it is preferable to hold the second outer core materials 322 on the second downstream process mold cavity surfaces 220 and hold the intermediate molded bodies 33 on the first downstream process mold cavity surfaces 210. Further, in this case, in the raw core forming step (FIG. 11), as in the example of FIG. 11, the second outer core materials 322 are preferably assembled to the intermediate molded bodies 33 by closing the first downstream process mold 21 and the second downstream process mold 22 against each other.

With the above configuration, the second outer core materials 322 may be assembled to the intermediate molded bodies 33 by closing the first downstream process mold 21 and the second downstream process mold 22 against each other (in the raw core forming step), immediately after the intermediate plate 23 is removed (in the intermediate plate removal step). This reduces the total time required for the multilayer cores 3 to be molded. Further, in a period after the intermediate plate 23 is removed from the downstream process molding apparatus 2 and before the second outer core materials 322 are assembled to the intermediate molded bodies 33, the second outer core materials 322, and the first outer core materials 321 of the intermediate molded bodies 33 may be prevented from being deformed by the residual stress of the rubber, and thus, the eccentricity in the inner cores 31 may be prevented.

In the examples described herein, in the preparatory molding step (FIG. 9) in the downstream process, as in the example of FIG. 9, part of the first outer core material 321 of each intermediate molded body 33 preferably sticks out from between the corresponding first downstream process mold cavity surface 210 and the corresponding intermediate plate cavity surface 230 (i.e., from the corresponding first downstream process mold cavity 24a) to form a first flash 321b between the first downstream process mold 21 and the intermediate plate 23, and part of the second outer core material 322 preferably sticks out from between the corresponding intermediate plate projecting surface 231 and the corresponding second downstream process mold cavity surface 220 (i.e., from the corresponding second downstream process mold cavity 24b) to form a second flash 322b between the intermediate plate 23 and the second downstream process mold 22.

With the above configuration, in the subsequent intermediate plate removal step (FIG. 10), the first flashes 321b attach to the first downstream process mold 21, thereby facilitating the intermediate molded bodies 33 to be held on the first downstream process mold cavity surfaces 210, and the second flashes 322b attach to the second downstream process mold 22, thereby facilitating the second outer core materials 322 to be held on the second downstream process mold cavity surfaces 220. In other words, when the first downstream process mold 21, the intermediate plate 23, and the second downstream process mold 22 in the downstream process molding apparatus 2 are released from each other, a situation may be prevented in which the intermediate molded bodies 33 and the second outer core materials 32 attach to the intermediate plate 23 and fail to detach from the intermediate plate 23.

Further, with the above configuration, in the intermediate plate removal step (FIG. 10), while the intermediate molded bodies 33 are held on the first downstream process mold cavity surfaces 210 and the second outer core materials 322 are held on the second downstream process mold cavity surfaces 220, the first flashes 321b attached to the first downstream process mold 21 pull the first outer core materials 321 of the intermediate molded bodies 33 toward the outer side in the circumferential direction, thereby preventing the first outer core materials 321 from contracting due to the residual stress of the rubber, and the second flashes 322b attached to the second downstream process mold 22 pull the second outer core materials 322 toward the outer side in the circumferential direction, thereby preventing the second outer core materials 322 from contracting due to the residual stress of the rubber. Accordingly, the eccentricity in the inner cores 31 may be prevented.

Additionally, in this case, the first flashes 321b and the second flashes 322b are assembled to each other in the raw core forming step (FIG. 11). Subsequently, in the vulcanization step, the first flashes 321b and the second flashes 322b are vulcanized and integrated with each other to form the joining flashes 36 (FIGS. 11 and 12). In the vulcanization step, a continuous molded body 37, which includes the integrally coupled multilayer cores 3 and joining flashes 36, is molded. Subsequently, in the multilayer core removal step (FIGS. 12 and 13), the continuous molded body 37 formed in the vulcanization step is removed from the downstream process molding apparatus 2. After that, the joining flashes 36 are removed from the continuous molded body 37 (in the flash removal step), and the multilayer cores 3 are finally obtained.

Additionally, as in the example of FIG. 9, the first flashes 321b preferably have parts in which the first outer core materials 321 of the plurality of intermediate molded bodies 33 are coupled to each other. Further, as in the example of FIG. 9, the second flashes 322b preferably have parts in which the plurality of second outer core materials 322 are coupled to each other.

A total volume of the joining flashes 36 in the continuous molded body 37 is preferably 5 to 20% of a total volume of the plurality of multilayer cores 3 in the continuous molded body 37.

In the preparatory molding step (FIG. 9), however, the formation of the first flashes 321b and the second flashes 322b may be omitted.

In the examples described herein, when the first flashes 321b are formed in the preparatory molding step (FIG. 9) as described above, the first downstream process mold 21 preferably includes, on the surface thereof that is closer to the intermediate plate 23c, one or more (e.g., in the example of FIG. 9, a plurality of) grooves 212 that are located on the outer side in the circumferential direction of the first downstream process mold cavity surfaces 210. In this case, the first downstream process mold 21 preferably includes, on the surface thereof that is closer to the intermediate plate 23, the flat surfaces 215 that extend between the first downstream process mold cavity surfaces 210 and the grooves 212 in parallel to the downstream process mold perpendicular-to-axis direction OPD to couple the first downstream process mold cavity surfaces 210 and the grooves 212. The flat surfaces 215 are located at the same positions in the downstream process mold axial direction OAD, with respect to the open end surfaces of the first downstream process mold cavity surfaces 210. Due to this configuration, the first flashes 321b formed in the preparatory molding step (FIG. 9) include thick portions 321bk, which are molded between the grooves 212 of the first downstream process mold 21 and the first flat surfaces 233 of the intermediate plate 23, and thin portions 321bn, which are molded between the flat surfaces 215 located between the first downstream process mold cavity surfaces 210 and the grooves 212 in the first downstream process mold 21, and the first flat surfaces 233 of the intermediate plate 23. The thin portions 321bn are smaller in thickness than the thick portions 321bk in the downstream process mold axial direction OAD. The thin portions 321bn couple the first outer core materials 321 of the intermediate molded bodies 33 and the thick portions 321bk. Since having the thick portions 321bk, the first flashes 321b may be more firmly attached to the first downstream process mold 21, and this facilitates the intermediate molded bodies 33 to be held on the first downstream process mold cavity surfaces 210. Further, since having the thin portions 321bn, the first flashes 321b may be easily broken at the thin portions 321bn in the flash removal step, and thus, the operation of removing the first flashes 321b is simplified.

The grooves 212 preferably extend continuously, on the outer side in the circumferential direction of the first downstream process mold cavity surfaces 210, over the entire circumferences. This case implies that the thick portions 321bk of the first flashes 321b that are molded by the grooves 212 continuously extend, on the outer side in the circumferential direction of the intermediate molded bodies 33, over the entire circumferences. This allows the first flashes 321b to be more firmly attached to the first downstream process mold 21.

Further, the flat surfaces 215, which are located between the first downstream process mold cavity surfaces 210 and the grooves 212, preferably extend continuously over the entire circumferences around the first downstream process mold cavity surfaces 210. This case implies that the thin portions 321bn of the first flashes 321b that are molded by the flat surfaces 215 extend continuously over the entire circumferences between the intermediate molded bodies 33 and the thick portions 321bk. Thus, the operation of removing the first flashes 321b is even more simplified.

In this case, at least one of the one or more grooves 212 in the first downstream process mold 21 preferably includes, on a groove bottom surface thereof (i.e., on a surface thereof that is located opposite to the open end surface of the groove 212), a convexity 213 (FIG. 9). In the example of FIG. 9, only one or more grooves 212a in the plurality of grooves 212 that are located between the plurality of first downstream process mold cavity surfaces 210 include, on the groove bottom surfaces thereof, the convexities 213. The grooves 212 including the convexities 213 will provide the thick portions 321bk of the first flashes 321b formed in the preparatory molding step (FIG. 9) with concavities 321bg molded in accordance with the convexities 213. A resulting anchor effect allows the first flashes 321b to be even more firmly attached to the first downstream process mold 21, thereby further facilitating the intermediate molded bodies 33 to be held on the first downstream process mold cavity surfaces 210 in the intermediate plate removal step (FIG. 10).

Additionally, in the example of FIG. 9, in the preparatory molding step (FIG. 9), in part of the first downstream process mold 21 that is located on the outer side in the circumferential direction of the one or more (e.g., in the example of FIG. 9, the plurality of) grooves 212 included in the first downstream process mold 21, the flat surfaces 214 of the first downstream process mold 21 and the first flat surfaces 233 of the intermediate plate 23 are in abutment contact with each other, without forming any first flash 321b.

Similarly in the examples described herein, when the second flashes 322b are formed in the preparatory molding step as described above (FIG. 9), the second downstream process mold 22 preferably includes, on the surface thereof that is closer to the intermediate plate 23, one or more (e.g., in the example of FIG. 9, a plurality of) grooves 222 that are located on the outer side in the circumferential direction of the second downstream process mold cavity surfaces 220. In this case, the second downstream process mold 22 preferably includes, on the surface thereof that is closer to the intermediate plate 23, the flat surfaces 225 that extend between the second downstream process mold cavity surfaces 220 and the grooves 222 in parallel to the downstream process mold perpendicular-to-axis direction OPD to couple the second downstream process mold cavity surfaces 220 and the grooves 222. The flat surface 225 are located at the same positions in the downstream process mold axial direction OAD, with respect to the opening end surfaces of the second downstream process mold cavity surfaces 220. Due to this configuration, the second flashes 322b formed in the preparatory molding step (FIG. 9) include thick portions 322bk, which are molded between the grooves 222 of the second downstream process mold 22 and the second flat surfaces 234 of the intermediate plate 23, and thin portions 322bn, which are molded between the flat surfaces 225 located between the second downstream process mold cavity surfaces 220 and the grooves 222 in the second downstream process mold 22, and the second flat surfaces 234 of the intermediate plate 23. The thin portions 322bn are smaller in thickness than the thick portions 322bk in the downstream process mold axial direction OAD. The thin portions 322bn couple the second outer core materials 322 and the thick portions 322bk. Since having the thick portions 322bk, the second flashes 322b may be more firmly attached to the second downstream process mold 22, and this facilitates the second outer core materials 322 to be held on the second downstream process mold cavity surfaces 220 in the intermediate plate removal step (FIG. 10). Further, since having the thin portions 322bn, the second flashes 322b may be easily broken at the thin portions 322bn in the flash removal step, and thus, the operation of removing the second flashes 322b is simplified.

The grooves 222 preferably extend continuously, on the outer side in the circumferential direction of the second downstream process mold cavity surfaces 220, over the entire circumferences. This case implies that the thick portions 322bk of the second flashes 322b that are molded by the grooves 222 continuously extend, on the outer side in the circumferential direction of the second outer core materials 322, over the entire circumferences. This allows the second flashes 322b to be more firmly attached to the second downstream process mold 22.

Further, the flat surfaces 225, which are located between the second downstream process mold cavity surfaces 220 and the grooves 222, preferably extend continuously over the entire circumferences around the second downstream process mold cavity surfaces 220. This case implies that the thin portions 322bn of the second flashes 322b that are molded by the flat surfaces 225 extend continuously over the entire circumferences between the second outer core materials 322 and the thick portions 322bk. Thus, the operation of removing the second flash 322b is even more simplified.

In this case, at least one of the one or more grooves 222 of the second downstream process mold 22 preferably includes, on a groove bottom surface (i.e., on a surface thereof that is located opposite to the open end surface of the groove 222), a convexity 223 (FIG. 9). In the example of FIG. 9, only one or more grooves 222a in the plurality of grooves 222 that are located between the plurality of second downstream process mold cavity surfaces 220 include, on the groove bottom surfaces thereof, the convexities 223. The grooves 222 including the convexities 223 will provide the thick portions 322bk of the second flashes 322b formed in the preparatory molding step (FIG. 9) with concavities 322bg molded in accordance with the convexities 223. A resulting anchor effect allows the second flashes 322b to be even more firmly attached to the second downstream process mold 22, thereby further facilitating the second outer core materials 322 to be held on the second downstream process mold cavity surfaces 220 in the intermediate plate removal step (FIG. 10).

Additionally, in the example of FIG. 9, in the preparatory molding step (FIG. 9), in part of the second downstream process mold 22 that is located on the outer side in the circumferential direction of the one or more (e.g., in the example of FIG. 9, the plurality of) grooves 222 included in the second downstream process mold 22, the flat surfaces 224 of the second downstream process mold 22 and the second flat surface 234 of the intermediate plate 23 are in abutment contact with each other, without forming any second flash 322b.

In the examples illustrated in FIGS. 11 and 12, in the vulcanization step (FIGS. 11 and 12), and the thick portions 321bk of the first flashes 321b and the thick portions 322bk of the second flashes 322b are joined to form thick portions 36k of the joining flashes 36, the thin portions 321bn of the first flashes 321b and the thin portions 322bn of the second flashes 322b are joined to form thin portions 36n of the joining flashes 36.

In the preparatory molding step (FIG. 9) in the downstream process, at least part of the first outer core materials 321 and the second outer core materials 322 that are located on the inner side in the circumferential direction in the intermediate molded bodies 33 are maintained preferably in the unvulcanized or the semi-vulcanized state, more preferably in the unvulcanized state. This increases the degree of adhesion between the first outer core materials 321 and the second outer core materials 322, and the inner cores 31 in the subsequent vulcanization step, and thus, the durability of the multilayer cores 3 may be improved.

Further, in the preparatory molding step (FIG. 9) in the downstream process, part of the first outer core materials 321 and the second outer core materials 322 that are located on the outer side in the circumferential direction in the intermediate molded bodies 33 are preferably brought into the semi-vulcanized or the vulcanized state. This allows the part of the first outer core materials 321 and the second outer core materials 322 that are located on the outer side in the circumferential direction to be moderately cured, and thus, the spherical outer surfaces of the outer cores 32 may be molded with higher precision, and the eccentricity in the inner cores 31 may be prevented.

From the above perspective, in the examples described herein, in the preparatory molding step (FIG. 9) in the downstream process, when a temperature of the first downstream process mold 21 is T1 and a temperature of the second downstream process mold 22 is T2, T1 and T2 preferably satisfy the relation T1≥T2.

Further, in the preparatory molding step (FIG. 9) in the downstream process, when a temperature of the intermediate plate 23 is T3, T1 and T3 preferably satisfy the relation T1≥T3, and more preferably satisfy the relation T1>T3. Further, T2 and T3 preferably satisfy the relation T2≥T3, and more preferably satisfy the relation T2>T3.

Further, T1, T2, and T3 preferably satisfy the relation T1≥T2≥T3. More preferably, T1, T2, and T3 satisfy the relation T1=T2>T3 or satisfy the relation T1>T2>T3.

Further, T1 preferably satisfies 80° C.<T1<170° C., and more preferably satisfies 150° C.<T1<170° C. T2 preferably satisfies 80° C.<T2<170° C., and more preferably satisfies 150° C.<T2<170° C. T3 is preferably 50 to 100° C.

Additionally, these magnitude relations and numerical ranges of the temperatures T1, T2, and T3 are also preferable from the perspective of enabling the second outer core materials 322 to be held on the second downstream process mold cavity surfaces 220 and also enabling the intermediate molded bodies 33 to be held on the first downstream process mold cavity surfaces 210, while the first downstream process mold 21, the second downstream process mold 22, and the intermediate plate 23 in the downstream process molding apparatus 2 are released from each other and the intermediate plate 23 is removed from the downstream process molding apparatus 2 in the subsequent intermediate plate removal step (FIG. 10).

In the examples described herein, it is preferable that a temperature T1' of the first downstream process mold 21 and a temperature T2' of the second downstream process mold 22 in the vulcanization step (FIG. 11) in the downstream process are respectively equal to the temperature T1 of the first downstream process mold 21 and the temperature T2 of the second downstream process mold 22 in the preparatory molding step (FIG. 9) in the downstream process. This omits the need for changing the temperature of the downstream process molding apparatus 2 in the preparatory molding step (FIG. 9) and the vulcanization step (FIG. 11) and improves workability, and also reduces the total time required for the multilayer cores 3 to be molded.

T1' and T2' may be, however, respectively different from T1 and T2.

In the examples described herein, a time period t of the compression molding in the preparatory molding step (FIG. 9) in the downstream process is preferably shorter than a time period t' of the vulcanization in the vulcanization step (FIG. 11) in the downstream process. This prevents the first outer core materials 321 and the second outer core materials 322 from excessively vulcanized before the vulcanization step.

The time period t is preferably, for example, 1 to 3 minutes. The time period t' is preferably, for example, 8 to 15 minutes.

A multilayer core molding method according to the present disclosure may be used to mold a multilayer core of a golf ball.

The invention claimed is:

1. A multilayer core molding method for molding a multilayer core of a golf ball, the multilayer core molding method comprising:
   an upstream process of obtaining an intermediate molded body; and
   a downstream process of performing molding using a downstream process molding apparatus, wherein
   the intermediate molded body includes:
   an inner core; and
   an unvulcanized or semi-vulcanized first outer core material that covers only part of a surface of the inner core and is integrated with the inner core,
   the downstream process molding apparatus includes:
   a first downstream process mold including a substantially hemispherical first downstream process mold cavity surface;
   a second downstream process mold including a substantially hemispherical second downstream process mold cavity surface; and
   an intermediate plate including a substantially hemispherical intermediate plate cavity surface configured to be arranged facing the first downstream process mold cavity surface, and a substantially hemispherical intermediate plate projecting surface configured to be arranged facing the second downstream process mold cavity surface, and wherein
   the downstream process includes:
   a second outer core arrangement step of arranging a second outer core material on the second downstream process mold cavity surface or the intermediate plate projecting surface;
   an intermediate molded body arrangement step of arranging the intermediate molded body on the intermediate plate cavity surface or the first downstream process mold cavity surface; and
   a preparatory molding step, performed after the second outer core arrangement step and the intermediate molded body arrangement step, of compression-molding the second outer core material and the intermediate molded body, in a state in which the first downstream process mold, the second downstream process mold, and the intermediate plate are closed against each other,
   in the preparatory molding step, part of the first outer core material of the intermediate molded body sticks out from between the first downstream process mold cavity surface and the intermediate plate cavity surface to form a first flash, and part of the second outer core material sticks out from between the intermediate plate projecting surface and the second downstream process mold cavity surface to form a second flash,
   the first flash and the second flash each includes a thick portion and a thin portion, the thin portion of the first flash couples the first outer core material of the intermediate molded body and the thick portion of the first flash, and the thin portion of the second flash couples the second outer core material and the thick portion of the second flash.

2. The multilayer core molding method according to claim 1, wherein
the downstream process further includes:
an intermediate plate removal step, performed after the preparatory molding step, of removing the intermediate plate; and
a raw core forming step, performed after the intermediate plate removal step, of assembling the second outer core material to the intermediate molded body to form a raw multilayer core.

3. The multilayer core molding method according to claim 2, wherein,
in the intermediate plate removal step, while the intermediate plate is removed, the second outer core material is held on the second downstream process mold cavity surface, and the intermediate molded body is held on the first downstream process mold cavity surface, and
in the raw core forming step, the first downstream process mold and the second downstream process mold are closed against each other to assemble the second outer core material to the intermediate molded body.

4. The multilayer core molding method according to claim 2, wherein
the downstream process further includes
a vulcanization step, performed after the raw core forming step, of vulcanizing the raw multilayer core in a state in which the first downstream process mold and the second downstream process mold are closed against each other.

5. The multilayer core molding method according to claim 4, wherein
a temperature $T1'$ of the first downstream process mold and a temperature $T2'$ of the second downstream process mold in the vulcanization step are respectively equal to a temperature $T1$ of the first downstream process mold and a temperature $T2$ of the second downstream process mold in the preparatory molding step.

6. The multilayer core molding method according to claim 4, wherein
a time period t of the compression molding in the preparatory molding step is shorter than a time period t' of the vulcanization in the vulcanization step.

7. The multilayer core molding method according to claim 4, wherein
in the vulcanization step, the first flash and the second flash are vulcanized and integrated with each other to form a joining flash, and a plurality of multilayer cores is coupled to each other by the joining flash.

8. The multilayer core molding method according to claim 1, wherein,
in the preparatory molding step, a temperature $T1$ of the first downstream process mold, a temperature $T2$ of the second downstream process mold, and a temperature $T3$ of the intermediate plate satisfy the relation $T1 \geq T2 \geq T3$.

9. The multilayer core molding method according to claim 1, wherein,
in the preparatory molding step, a temperature $T1$ of the first downstream process mold, a temperature $T2$ of the second downstream process mold, and a temperature $T3$ of the intermediate plate satisfy the relation $T1=T2>T3$.

10. The multilayer core molding method according to claim 1, wherein,
in the preparatory molding step, a temperature $T1$ of the first downstream process mold satisfies 80° C.$<T1<$170° C.

11. The multilayer core molding method according to claim 1, wherein,
in the preparatory molding step, a temperature $T1$ of the first downstream process mold, a temperature $T2$ of the second downstream process mold, and a temperature $T3$ of the intermediate plate satisfy the relation $T1>T2>T3$.

12. The multilayer core molding method according to claim 1, wherein
the thick portion of the first flash continuously extends, on the outer side in the circumferential direction of the intermediate molded body, over the entire circumference, and the thick portion of the second flash continuously extends, on the outer side in the circumferential direction of the second outer core material, over the entire circumference.

* * * * *